(12) United States Patent
Etoh

(10) Patent No.: US 10,108,200 B2
(45) Date of Patent: Oct. 23, 2018

(54) AUTONOMOUS TRAVELING APPARATUS

(71) Applicant: Sharp Kabushiki Kaisha, Sakai, Osaka (JP)

(72) Inventor: Atsushi Etoh, Sakai (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 15/520,245

(22) PCT Filed: Oct. 30, 2015

(86) PCT No.: PCT/JP2015/080832
§ 371 (c)(1),
(2) Date: Apr. 19, 2017

(87) PCT Pub. No.: WO2016/076148
PCT Pub. Date: May 19, 2016

(65) Prior Publication Data
US 2017/0315559 A1    Nov. 2, 2017

(30) Foreign Application Priority Data
Nov. 14, 2014  (JP) ................................. 2014-231770

(51) Int. Cl.
*G05D 1/02* (2006.01)
*B60K 31/00* (2006.01)
(Continued)

(52) U.S. Cl.
CPC ....... *G05D 1/0246* (2013.01); *B60K 31/0008* (2013.01); *B60R 1/00* (2013.01);
(Continued)

(58) Field of Classification Search
CPC ........ B60K 2031/0016; B60K 31/0008; B60R 1/00; B60R 2300/307; G05D 1/0088; G05D 1/0246; G05D 2201/0213
See application file for complete search history.

(56) References Cited

U.S. PATENT DOCUMENTS 6,064,926 A * 5/2000 Sarangapani ........ G05D 1/0289
701/26
8,209,074 B2  6/2012 Sonoura
(Continued)

FOREIGN PATENT DOCUMENTS

EP       2 915 715 A1   9/2015
JP      2002-229645 A   8/2002
(Continued)

OTHER PUBLICATIONS

Official Communication issued in International Patent Application No. PCT/JP2015/080832, dated Dec. 8 2015.

*Primary Examiner* — Tyler J Lee
(74) *Attorney, Agent, or Firm* — Keating & Bennett, LLP

(57) ABSTRACT

In an autonomous traveling apparatus, a normal traveling area and a deceleration area are set for a monitoring area in an area setting unit. A speed control unit limits a traveling speed of an apparatus main body on the basis of the monitoring area set in the area setting unit and a distance from the apparatus main body to an obstacle within the monitoring area if the obstacle present within the monitoring area is detected. If the obstacle is a movable body, an area change unit changes the deceleration area within the monitoring area that is set in the area setting unit to a deceleration area for movable body. This configuration makes it possible to support even a case where an obstacle is a movable body, in limiting the traveling speed in response to obstacle detection.

13 Claims, 24 Drawing Sheets

(51) Int. Cl.
*G05D 1/00* (2006.01)
*B60R 1/00* (2006.01)

(52) U.S. Cl.
CPC .... *G05D 1/0088* (2013.01); *B60K 2031/0016* (2013.01); *B60R 2300/307* (2013.01); *G05D 2201/0213* (2013.01)

(56) References Cited

U.S. PATENT DOCUMENTS

| | | | | |
|---|---|---|---|---|
| 8,504,202 | B2* | 8/2013 | Ichinose | G05D 1/024 700/253 |
| 8,571,742 | B2* | 10/2013 | Takeoka | G05D 1/024 701/23 |
| 8,676,431 | B1* | 3/2014 | Mariet | B60T 7/22 701/28 |
| 8,996,224 | B1* | 3/2015 | Herbach | G05D 1/0011 180/116 |
| 9,182,762 | B2* | 11/2015 | Yabushita | G05D 1/024 |
| 9,229,450 | B2* | 1/2016 | Oshima | G05D 1/0238 |
| 9,541,922 | B2* | 1/2017 | Tsujimoto | G05D 1/0223 |
| 2008/0040040 | A1* | 2/2008 | Goto | G05D 1/024 701/301 |
| 2008/0201014 | A1 | 8/2008 | Sonoura | |
| 2009/0043440 | A1* | 2/2009 | Matsukawa | G05D 1/0214 701/25 |
| 2010/0106356 | A1* | 4/2010 | Trepagnier | G01S 17/023 701/25 |
| 2010/0324771 | A1* | 12/2010 | Yabushita | G05D 1/024 701/25 |
| 2011/0202247 | A1 | 8/2011 | Takeoka | |
| 2014/0095009 | A1* | 4/2014 | Oshima | G05D 1/0238 701/23 |
| 2014/0316633 | A1* | 10/2014 | Tsujimoto | G05D 1/0223 701/23 |

FOREIGN PATENT DOCUMENTS

| | | |
|---|---|---|
| JP | 2003-005834 A | 1/2003 |
| JP | 2006-285548 A | 10/2006 |
| JP | 2006-293662 A | 10/2006 |
| JP | 2008-200770 A | 9/2008 |
| JP | 2009-157735 A | 7/2009 |
| JP | 2011-165025 A | 8/2011 |
| WO | 2014/069584 A1 | 5/2014 |
| WO | 2014/091611 A1 | 6/2014 |

* cited by examiner

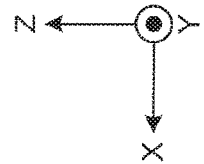
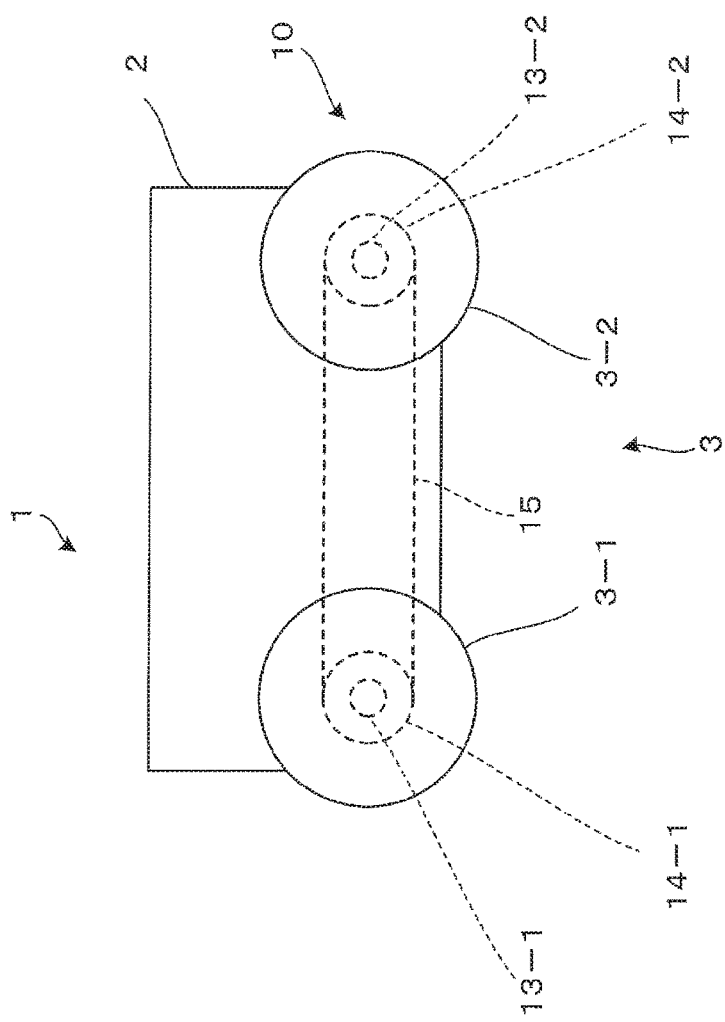
FIG. 1

AUTONOMOUS TRAVELING APPARATUS

TECHNICAL FIELD

The present invention relates to an autonomous traveling apparatus which travels along a monitoring route.

BACKGROUND ART

A technique has been developed for causing an apparatus to travel along a monitoring route (patrol path) and monitoring the monitoring route (for example, PTL 1).

In the technique described in PTL 1, a mobile robot moves in a designated movement direction (traveling direction) at a designated speed (traveling speed) in autonomous movement mode. If an obstacle in front in the traveling direction is detected, the mobile robot sends an abnormality signal to a monitoring center. Upon recognition of presence of an abnormality from the abnormality signal, a controller of the monitoring center performs remote operation on the mobile robot. At this time, the mobile robot moves at a traveling speed, at which the mobile robot can stop before contact with the obstacle, in accordance with an instruction from the monitoring center in remote operation mode.

CITATION LIST

Patent Literature
  PTL 1: Japanese Unexamined Patent Application Publication No. 2006-285548

SUMMARY OF INVENTION

Technical Problem

The technique described in PTL 1, however, cannot support a case where an obstacle is a movable body. This is because the mobile robot limits the traveling speed in accordance with an instruction from the monitoring center upon detection of an obstacle and does not limit the traveling speed while the mobile robot is waiting for an instruction from the monitoring center. Thus, if the obstacle is a movable body, the mobile robot may come into contact or collide with the obstacle while the mobile robot is waiting for an instruction from the monitoring center.

According to the technique described in PTL 1, when the mobile robot detects an obstacle, the controller of the monitoring center gives an instruction to the mobile robot. If the controller overlooks detection of the obstacle, the mobile robot may come into contact or collide with the obstacle while the mobile robot is waiting for an instruction from the monitoring center.

The present invention has been made in view of the above-described conventional problems, and has as its object to provide an autonomous traveling apparatus capable of supporting even a case where an obstacle is a movable body, in limiting a traveling speed in response to obstacle detection.

Solution to Problem

According to a first aspect of the present invention, an autonomous traveling apparatus includes: a traveling control unit which causes an apparatus main body to travel autonomously at a set speed; a monitoring device which monitors a monitoring area, the monitoring area being a region extending forward from the apparatus main body; an area setting unit, in which a normal traveling area and a deceleration area are set for the monitoring area, the normal traveling area being a region for the apparatus main body to travel at the set speed, the deceleration area being provided between the normal traveling area and the apparatus main body and being a region for the apparatus main body traveling at the set speed to travel while decelerating; an obstacle detection unit which detects an obstacle present in the monitoring area; a speed control unit which, if the obstacle is detected by the obstacle detection unit, limits a traveling speed of the apparatus main body on the basis of the monitoring area set in the area setting unit and a distance from the apparatus main body to the obstacle within the monitoring area; a determination unit which determines whether the obstacle detected by the obstacle detection unit is a movable body and outputs a determination result; and an area change unit which, if the determination result indicates that the obstacle is the movable body, changes the deceleration area within the monitoring area set in the area setting unit to a deceleration area for movable body which is wider than the deceleration area and narrower than the normal traveling area.

According to a second aspect of the present invention, in the first aspect, the autonomous traveling apparatus further includes a movable body registration unit, in which respective images representing a plurality of types of movable bodies are registered, the monitoring device includes a camera which photographs an image of the monitoring area and a distance-measuring sensor which measures the distance from the apparatus main body to the obstacle within the monitoring area, the obstacle detection unit detects an image of the obstacle, which is different from a background image, from the image of the monitoring area photographed by the camera, the determination unit outputs the determination result indicating that the obstacle detected by the obstacle detection unit is the movable body if the image of the obstacle detected by the obstacle detection unit coincides with an image of one movable body among the images of the plurality of types of movable bodies registered in the movable body registration unit, and the area change unit changes the deceleration area within the monitoring area set in the area setting unit to the deceleration area for movable body if the determination result indicates that the obstacle is the movable body.

According to a third aspect of the present invention, in the second aspect, the deceleration area for movable body is different for each of the types of the movable bodies.

According to a fourth aspect of the present invention, in the second or third aspect, an image of each of at least one movable body among the images of the plurality of types of movable bodies registered in the movable body registration unit represents a person, the determination unit outputs the determination result indicating that the obstacle detected by the obstacle detection unit is a person if the image of the obstacle detected by the obstacle detection unit coincides with an image representing the person among the images of the plurality of types of movable bodies registered in the movable body registration unit, and the area change unit changes the deceleration area within the monitoring area set in the area setting unit to a deceleration area for person, the deceleration area for person being the deceleration area for movable body, if the determination result indicates that the obstacle is the person.

According to a fifth aspect of the present invention, in the fourth aspect, the determination unit outputs the determination result indicating that the obstacle detected by the obstacle detection unit is a child if the image of the obstacle detected by the obstacle detection unit coincides with an image representing the child among the images of the plurality of types of movable bodies registered in the movable body registration unit, and the area change unit changes the deceleration area within the monitoring area set in the area setting unit to a deceleration area for child, the deceleration area for child being wider than the deceleration area for person and narrower than the normal traveling area, if the determination result indicates the obstacle is the child.

According to a sixth aspect of the present invention, in the fourth aspect, the person is a front-facing person, the determination unit outputs the determination result indicating that the obstacle detected by the obstacle detection unit is a laterally-facing person if the image of the obstacle detected by the obstacle detection unit coincides with an image representing the laterally-facing person among the images of the plurality of types of movable bodies registered in the movable body registration unit, and the area change unit changes the deceleration area within the monitoring area set in the area setting unit to a deceleration area for laterally-facing person, the deceleration area for laterally-facing person being wider than the deceleration area for person and narrower than the normal traveling area, if the determination result indicates that the obstacle is the laterally-facing person.

According to a seventh aspect of the present invention, in the first aspect, the monitoring device includes a distance-measuring sensor which measures a distance from the apparatus main body to the obstacle within the monitoring area, the determination unit calculates a differential value between a second distance and a first distance, the first distance being the distance measured last time by the distance-measuring sensor, the second distance being the distance measured this time by the distance-measuring sensor, and outputs the determination result indicating that the obstacle detected by the obstacle detection unit is the movable body if the differential value is different from a set value which is predicted from the traveling speed of the apparatus main body, and the area change unit changes the deceleration area within the monitoring area set in the area setting unit to the deceleration area for movable body if the determination result indicates that the obstacle is the movable body.

According to an eighth aspect of the present invention, in the first aspect, the autonomous traveling apparatus further includes a movable body registration unit, in which respective images representing a plurality of types of movable bodies are registered, the monitoring device includes a camera which photographs an image of the monitoring area, the obstacle detection unit detects an image of the obstacle, which is different from a background image, from the image of the monitoring area photographed by the camera, the determination unit calculates a second distance on the basis of a first distance, a first width, and a second width, the first distance being a distance from the apparatus main body to a boundary line of the monitoring area, the first width being a width of the image of the obstacle within the monitoring area that is detected for a first time by the obstacle detection unit, the second width being a width of the image of the obstacle within the monitoring area that is detected this time by the obstacle detection unit, the second distance being a distance from the apparatus main body to the obstacle within the monitoring area that is detected this time by the obstacle detection unit, and outputs the determination result indicating that the obstacle detected by the obstacle detection unit is the movable body if the second distance is different from a set distance which is predicted from the traveling speed of the apparatus main body, and the area change unit changes the deceleration area within the monitoring area set in the area setting unit to the deceleration area for movable body if the determination result indicates that the obstacle is the movable body.

According to a ninth aspect of the present invention, in any one of the second to eighth aspects, the autonomous traveling apparatus further includes an identification information detection unit which detects a piece of identification information when the person carrying an apparatus which outputs the piece of identification information intrudes into the monitoring area, a piece of registration identification information is further registered in association with an image representing the person in the movable body registration unit, and the determination unit outputs the determination result indicating that the obstacle detected by the obstacle detection unit is the person if the piece of identification information detected by the obstacle detection unit coincides with the piece of identification information registered in the movable body registration unit.

According to a tenth aspect of the present invention, in any one of the first to ninth aspects, the deceleration area is divided into a plurality of deceleration areas such that the apparatus main body traveling at the set speed travels while decelerating gradually.

Advantageous Effects of Invention

The present invention can support even a case where an obstacle is a movable body, in limiting a traveling speed in response to obstacle detection.

BRIEF DESCRIPTION OF DRAWINGS

FIG. 1 is a side view of an autonomous traveling apparatus 1 according to a first embodiment of the present invention.

Figure 10:
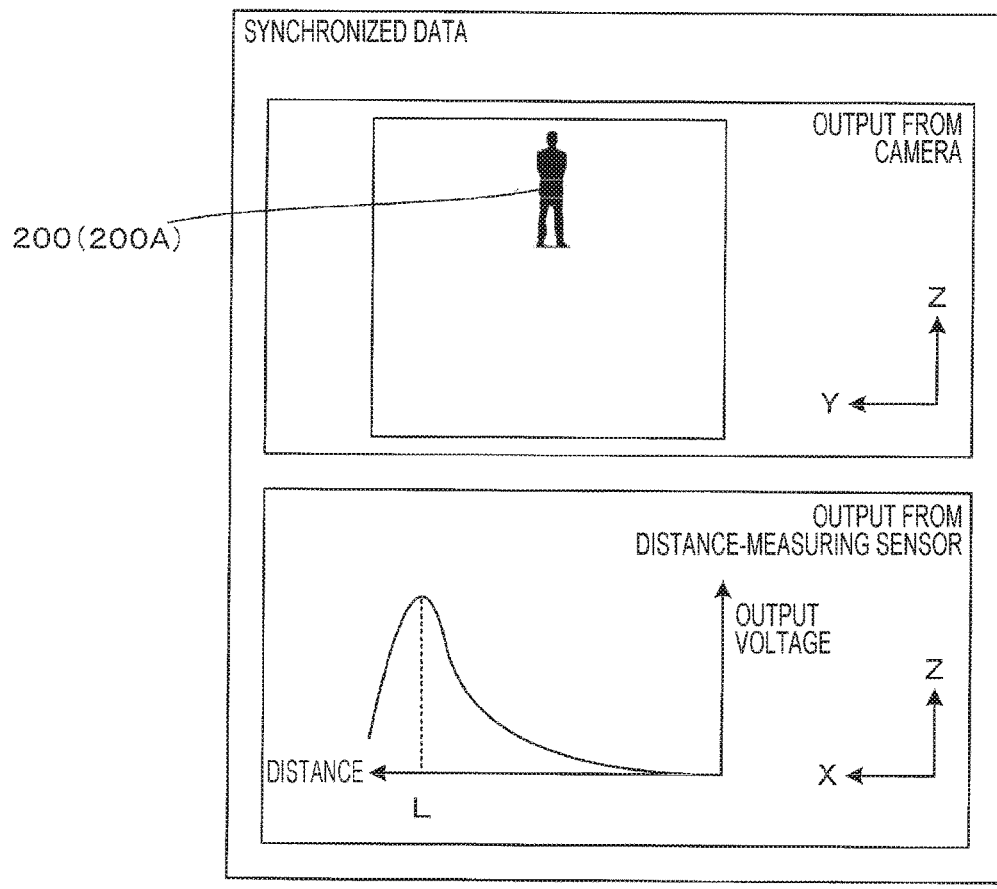

FIG. 10 is a view showing synchronized data (an output from the camera 41 and an output from the distance-measuring sensor 42) in a case where the obstacle 100 within the monitoring area 100 is a movable body 200 (a person 200A), in the autonomous traveling apparatus 1 according to the first embodiment of the present invention.

Figure 11:
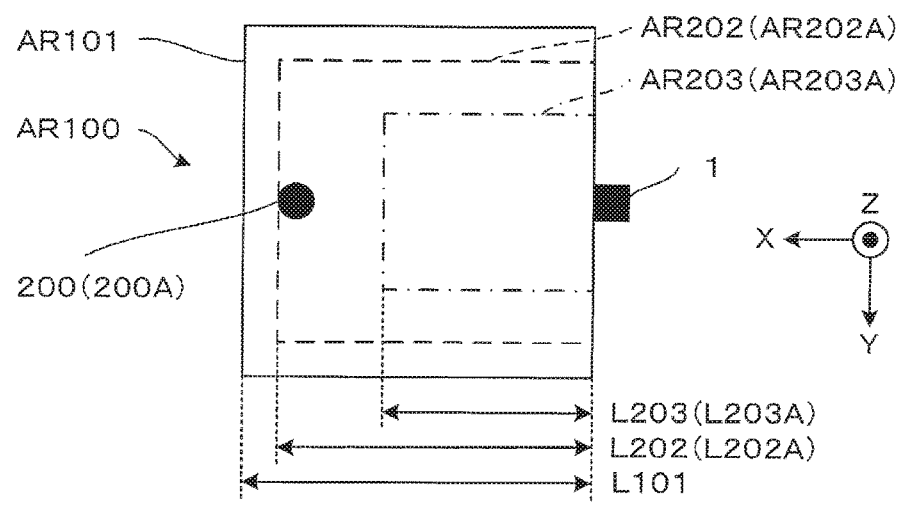

FIG. 11 is a view showing the monitoring area 100 in the case where the obstacle 100 within the monitoring area 100 is the movable body 200 (the person 200A), in the autonomous traveling apparatus 1 according to the first embodiment of the present invention.

Figure 12:
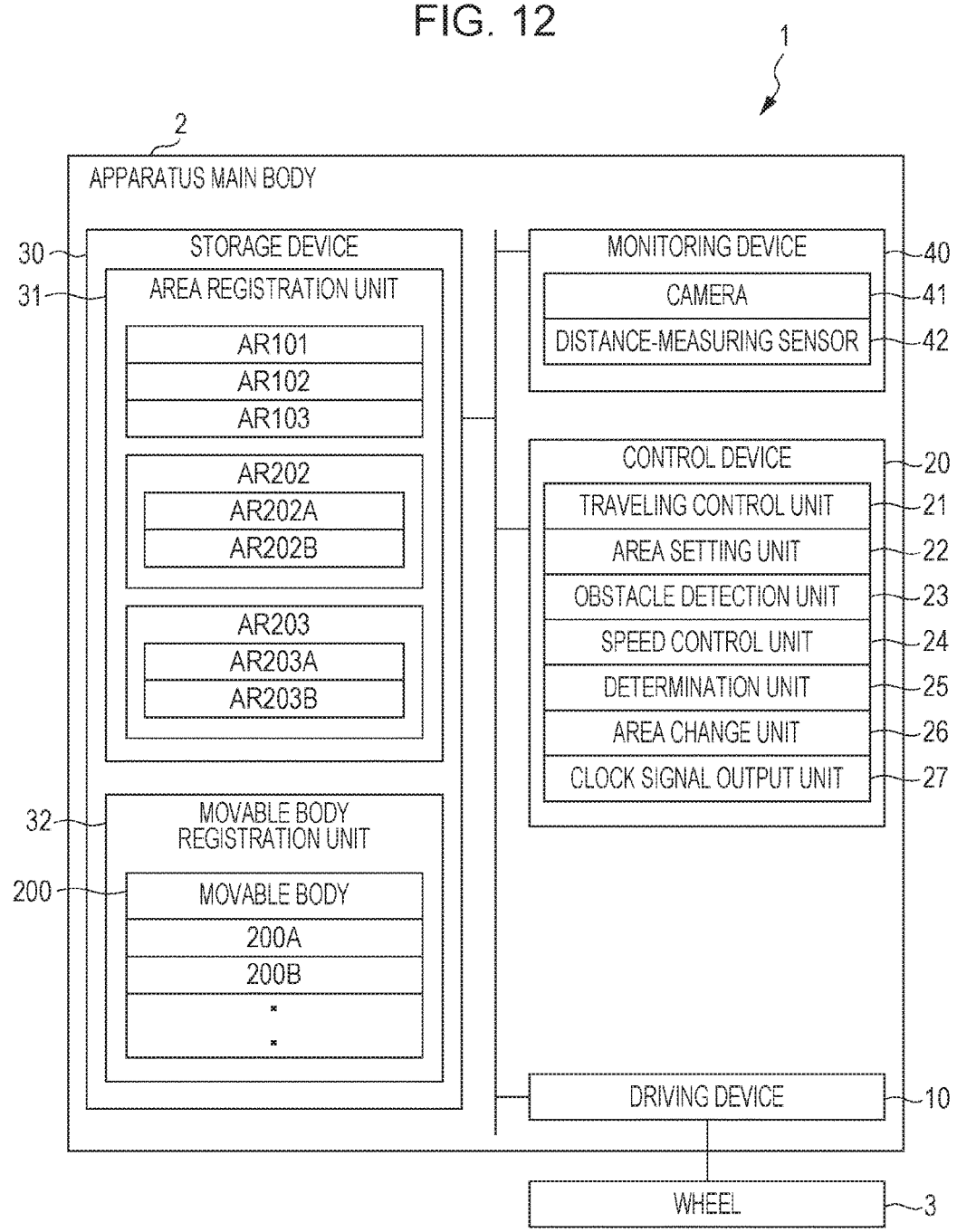

FIG. 12 is a block diagram showing the configuration of an autonomous traveling apparatus 1 according to a second embodiment of the present invention.

Figure 13:
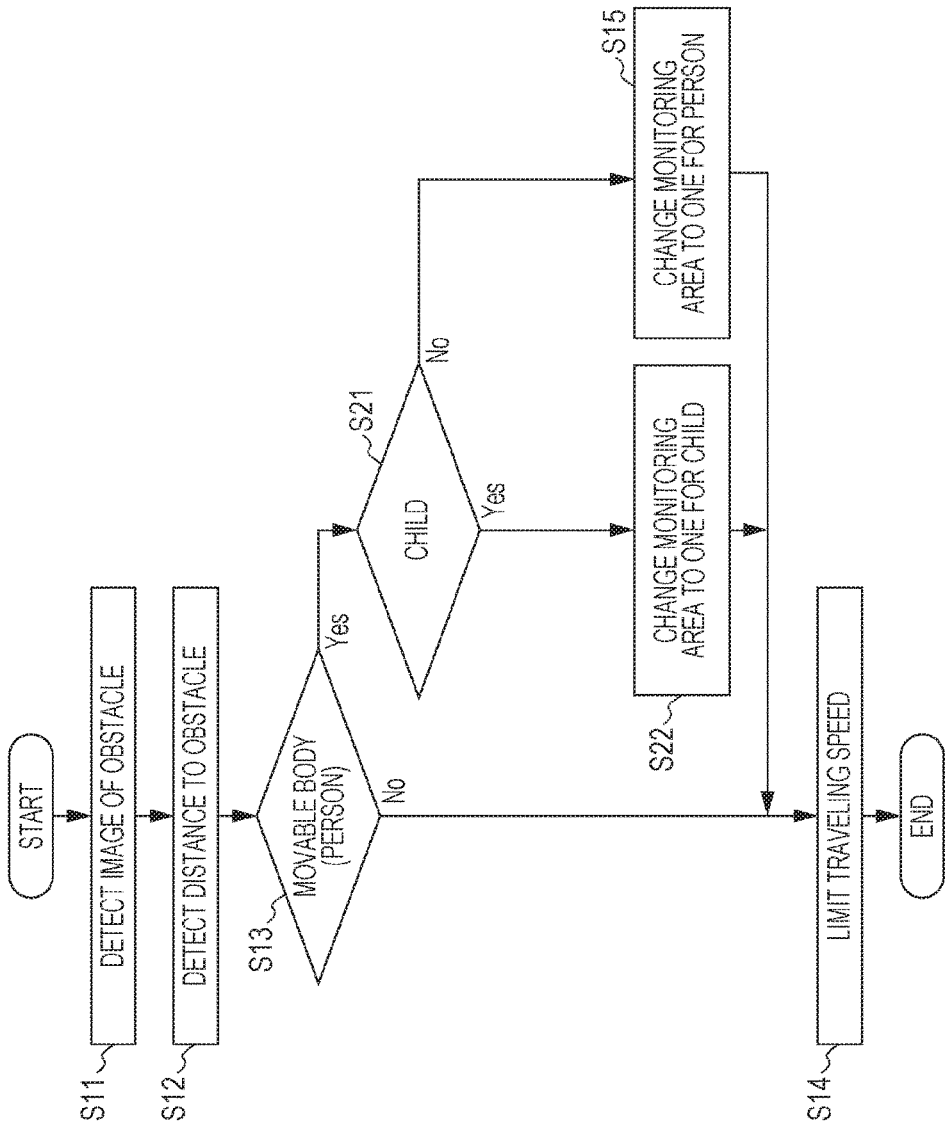

FIG. 13 is a flowchart showing the operation of the autonomous traveling apparatus 1 according to the second embodiment of the present invention.

Figure 14:
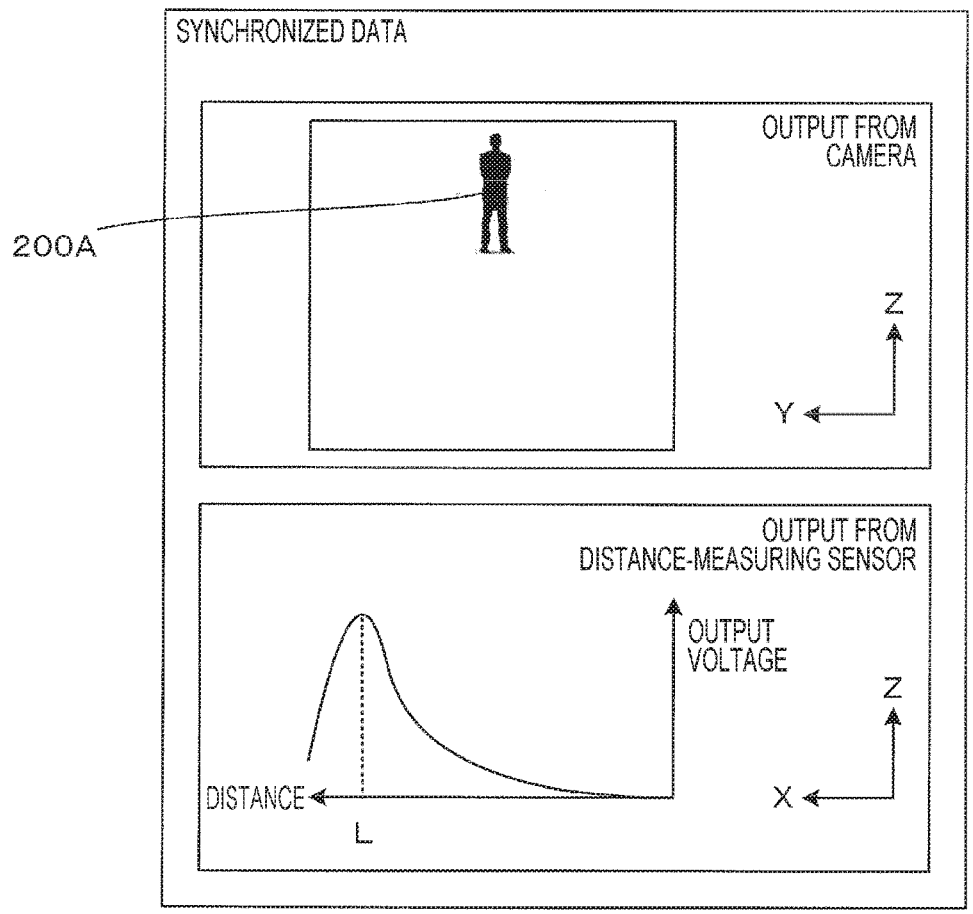

FIG. 14 is a view showing synchronized data (an output from a camera 41 and an output from a distance-measuring sensor 42) in a case where an obstacle 100 within a monitoring area 100 is an adult 200A, in the autonomous traveling apparatus 1 according to the second embodiment of the present invention.

Figure 15:
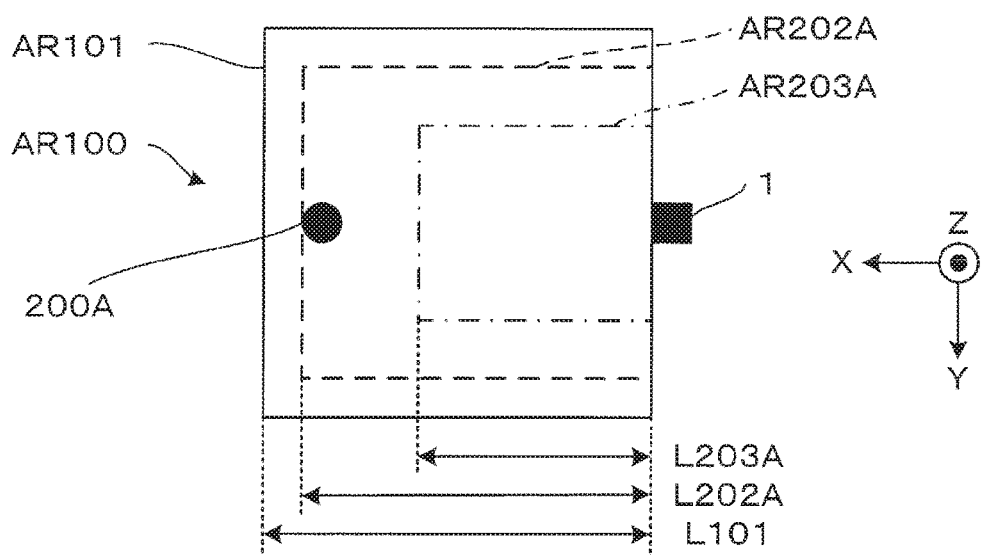

FIG. 15 is a view showing the monitoring area 100 in the case where the obstacle 100 within the monitoring area 100 is the adult 200A, in the autonomous traveling apparatus 1 according to the second embodiment of the present invention.

Figure 16:
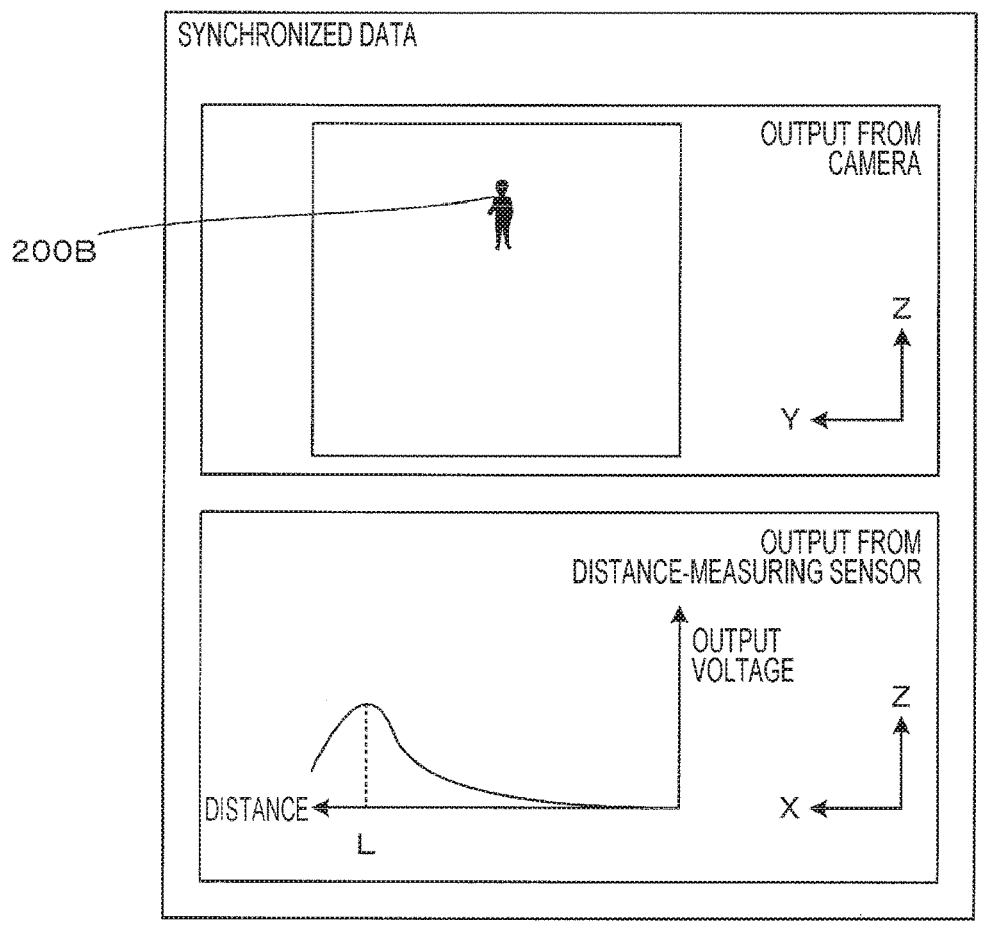

FIG. 16 is a view showing synchronized data (an output from the camera 41 and an output from the distance-measuring sensor 42) in a case where the obstacle 100 within the monitoring area 100 is a child 200B, in the autonomous traveling apparatus 1 according to the second embodiment of the present invention.

Figure 17:
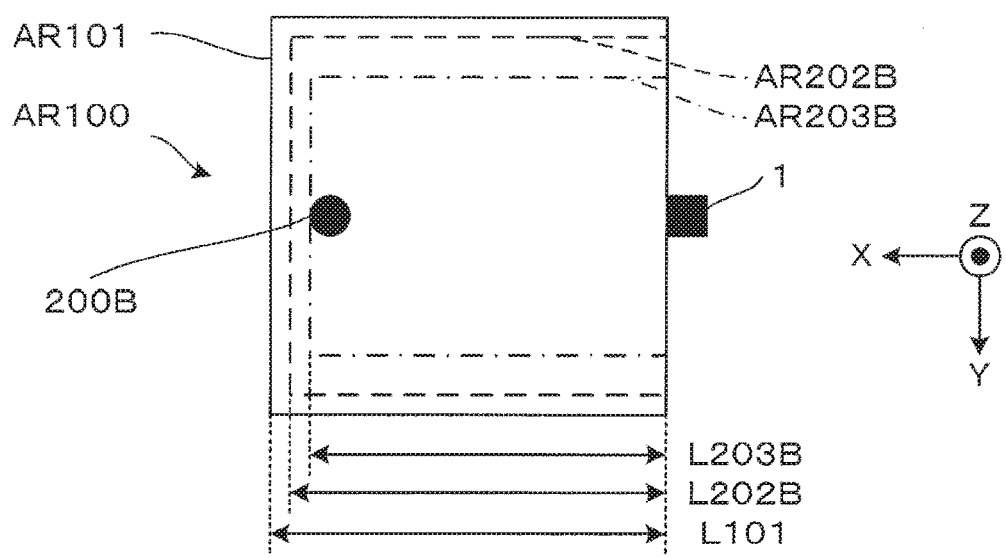

FIG. 17 is a view showing the monitoring area 100 in the case where the obstacle 100 within the monitoring area 100 is the child 200B, in the autonomous traveling apparatus 1 according to the second embodiment of the present invention.

Figure 18:
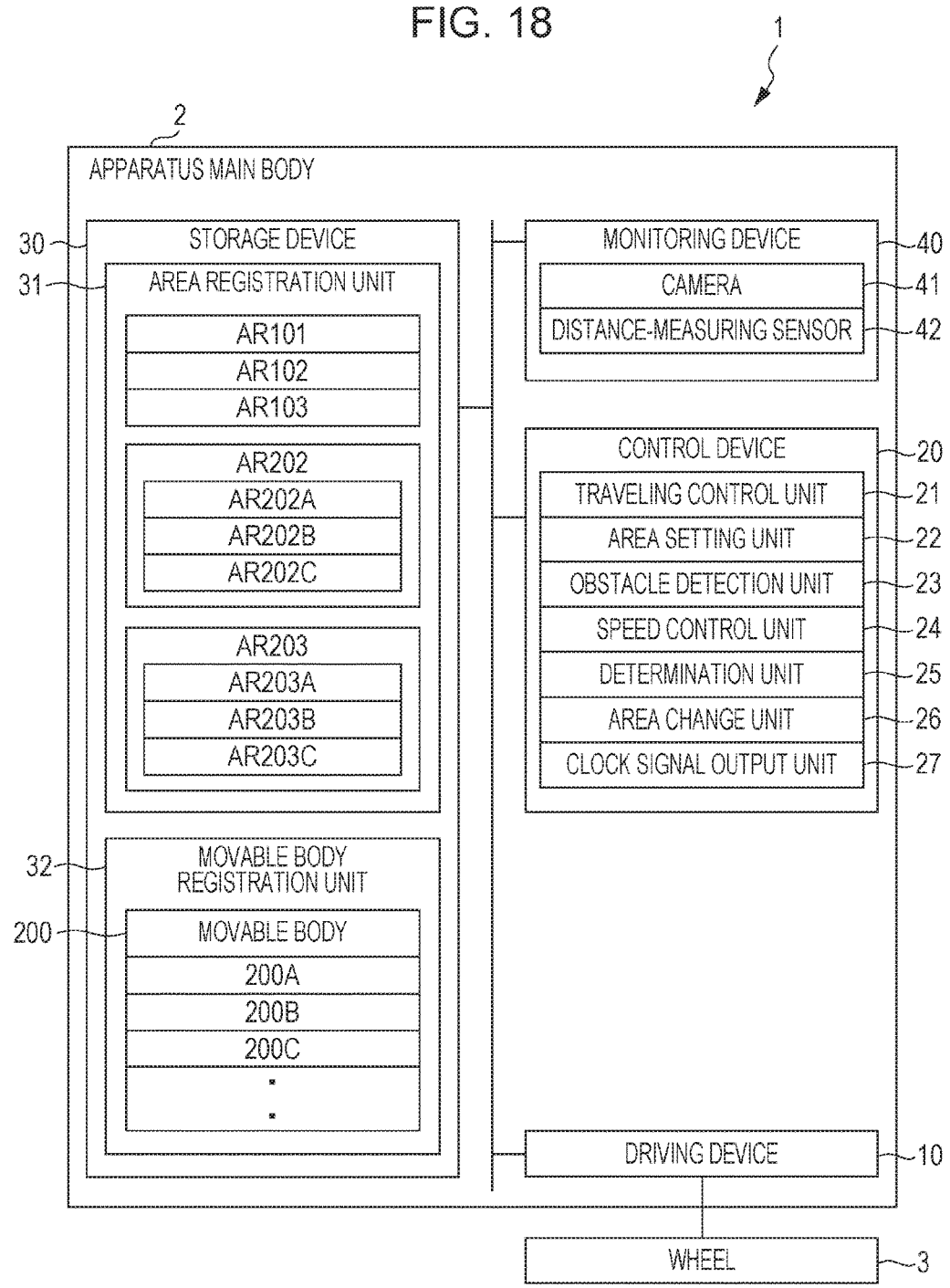

FIG. 18 is a block diagram showing the configuration of an autonomous traveling apparatus 1 according to a third embodiment of the present invention.

Figure 19:
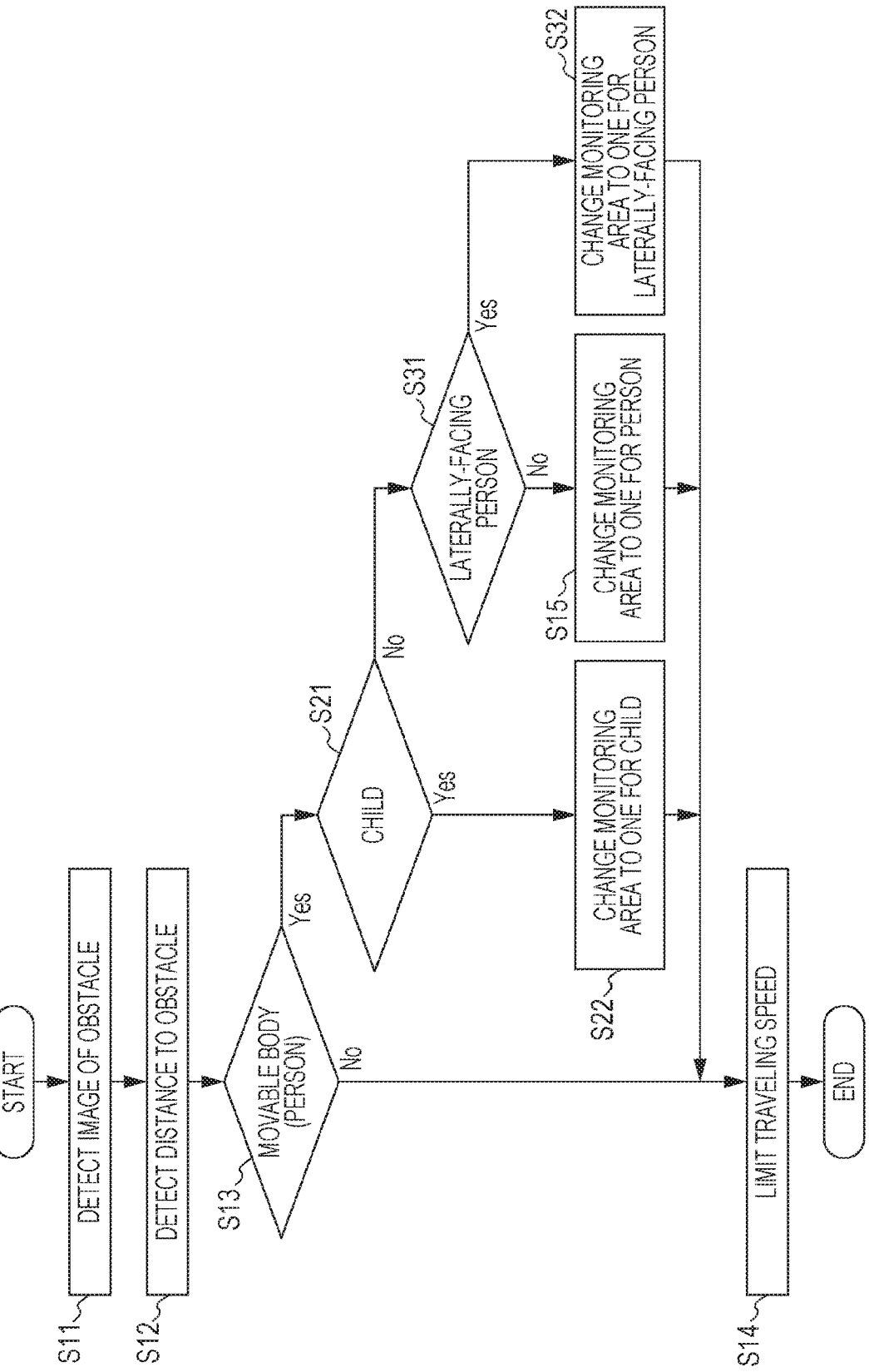

FIG. 19 is a flowchart showing the operation of the autonomous traveling apparatus 1 according to the third embodiment of the present invention.

Figure 20:
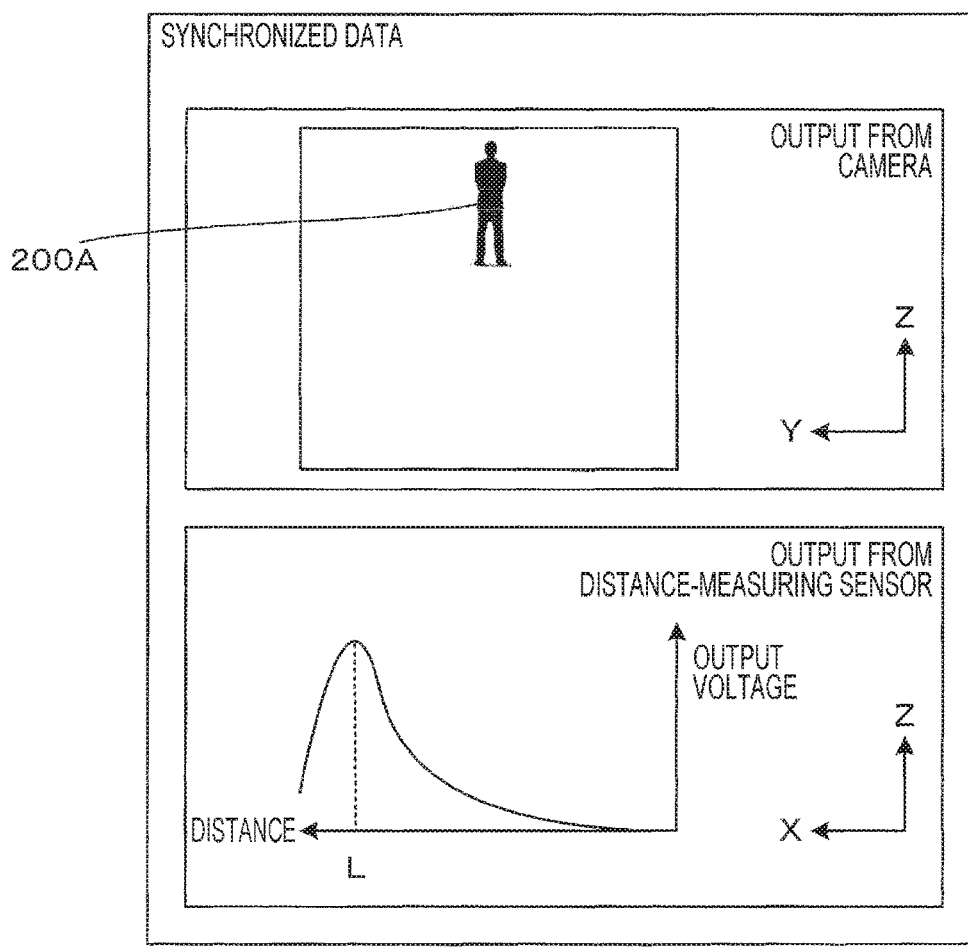

FIG. 20 is a view showing synchronized data (an output from a camera 41 and an output from a distance-measuring sensor 42) in a case where an obstacle 100 within a monitoring area 100 is a person 200A (a front-facing person), in the autonomous traveling apparatus 1 according to the third embodiment of the present invention.

Figure 21:
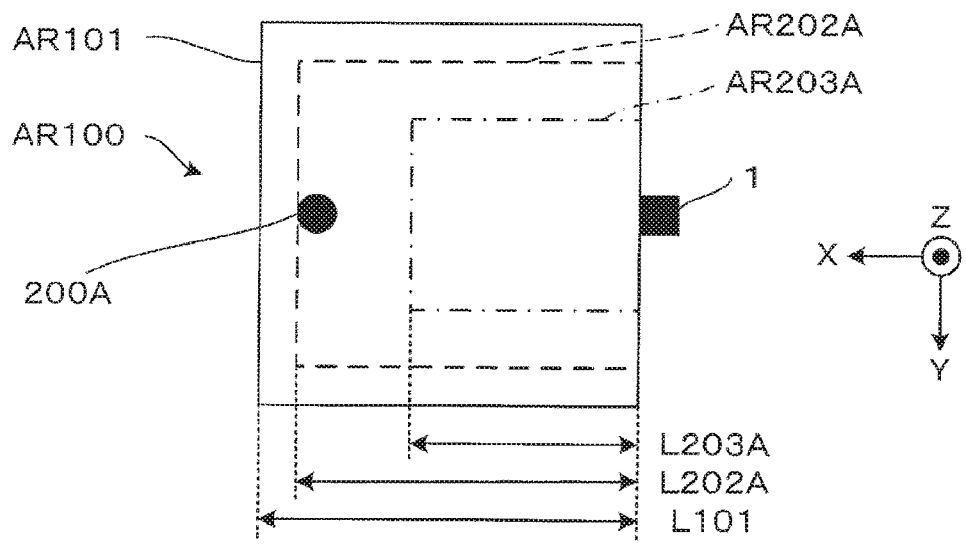

FIG. 21 is a view showing the monitoring area 100 in the case where the obstacle 100 within the monitoring area 100 is the person 200A (a front-facing person), in the autonomous traveling apparatus 1 according to the third embodiment of the present invention.

Figure 22:
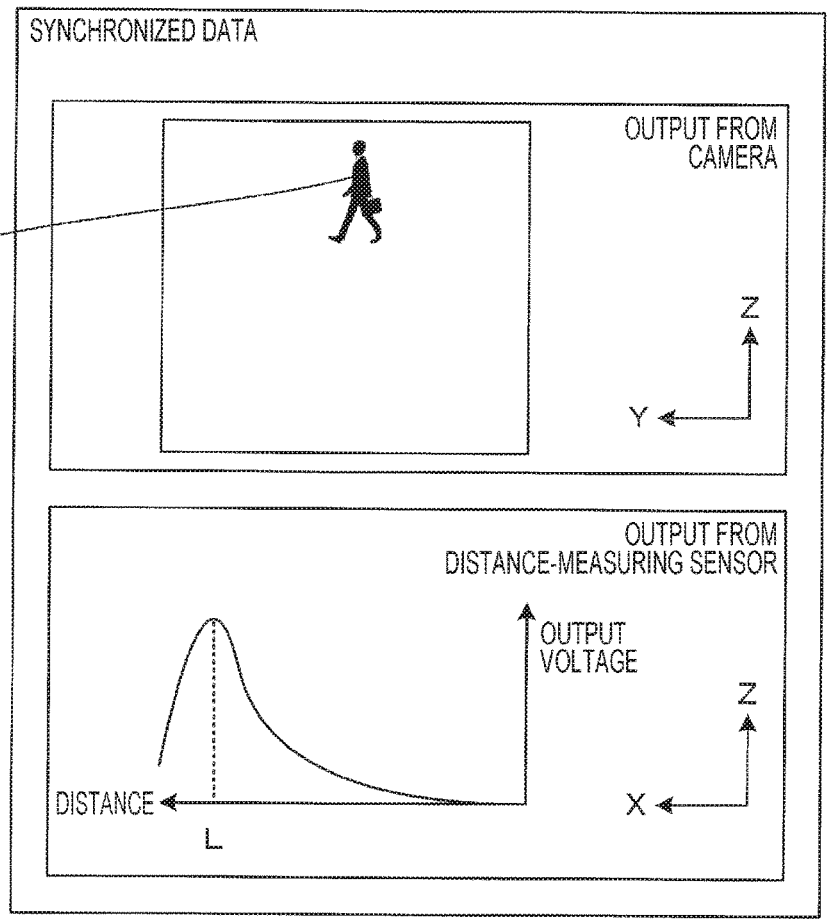

FIG. 22 is a view showing synchronized data (an output from the camera 41 and an output from the distance-measuring sensor 42) in a case where the obstacle 100 within the monitoring area 100 is a laterally-facing person 200C, in the autonomous traveling apparatus 1 according to the third embodiment of the present invention.

Figure 23:
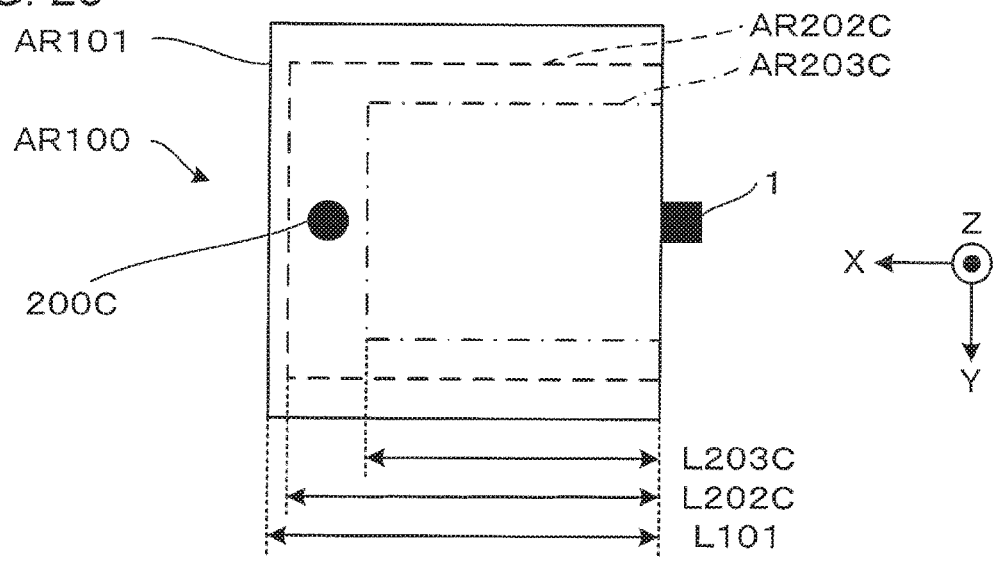

FIG. 23 is a view showing the monitoring area 100 in the case where the obstacle 100 within the monitoring area 100 is the laterally-facing person 200C, in the autonomous traveling apparatus 1 according to the third embodiment of the present invention.

Figure 24:
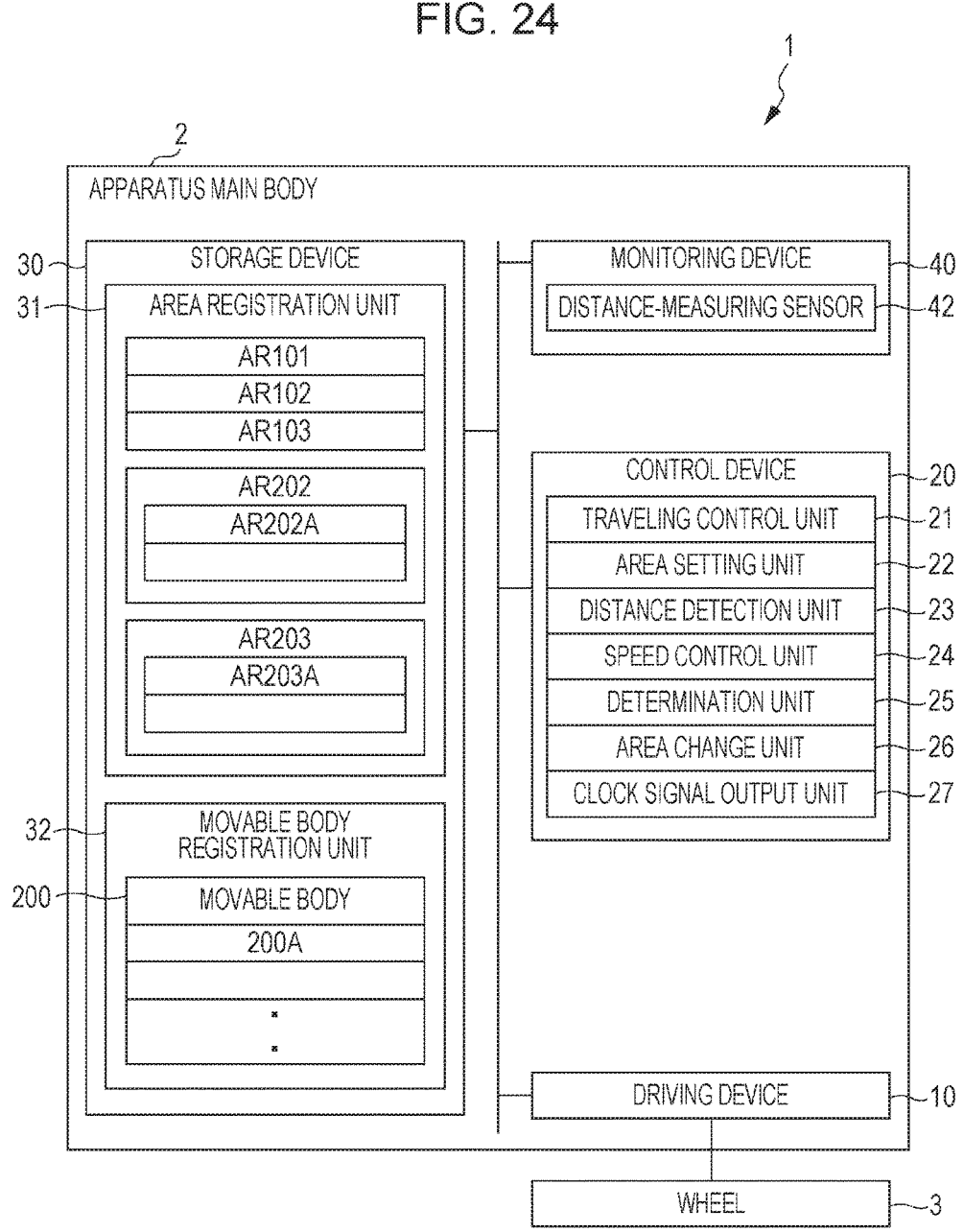

FIG. 24 is a block diagram showing the configuration of an autonomous traveling apparatus 1 according to a fourth embodiment of the present invention.

Figure 25:
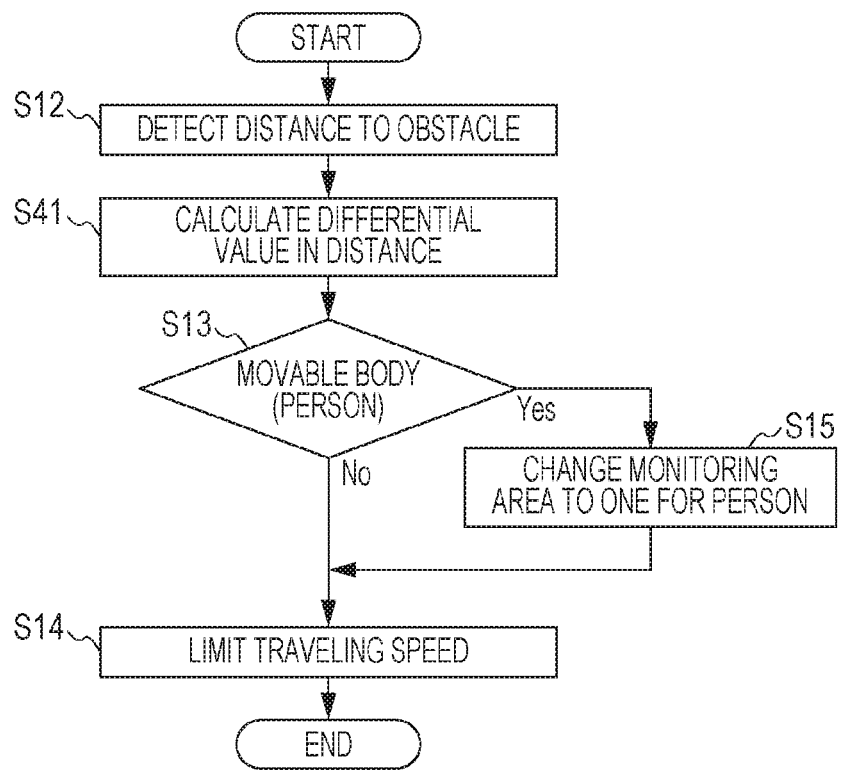

FIG. 25 is a flowchart showing the operation of the autonomous traveling apparatus 1 according to the fourth embodiment of the present invention.

Figure 26:
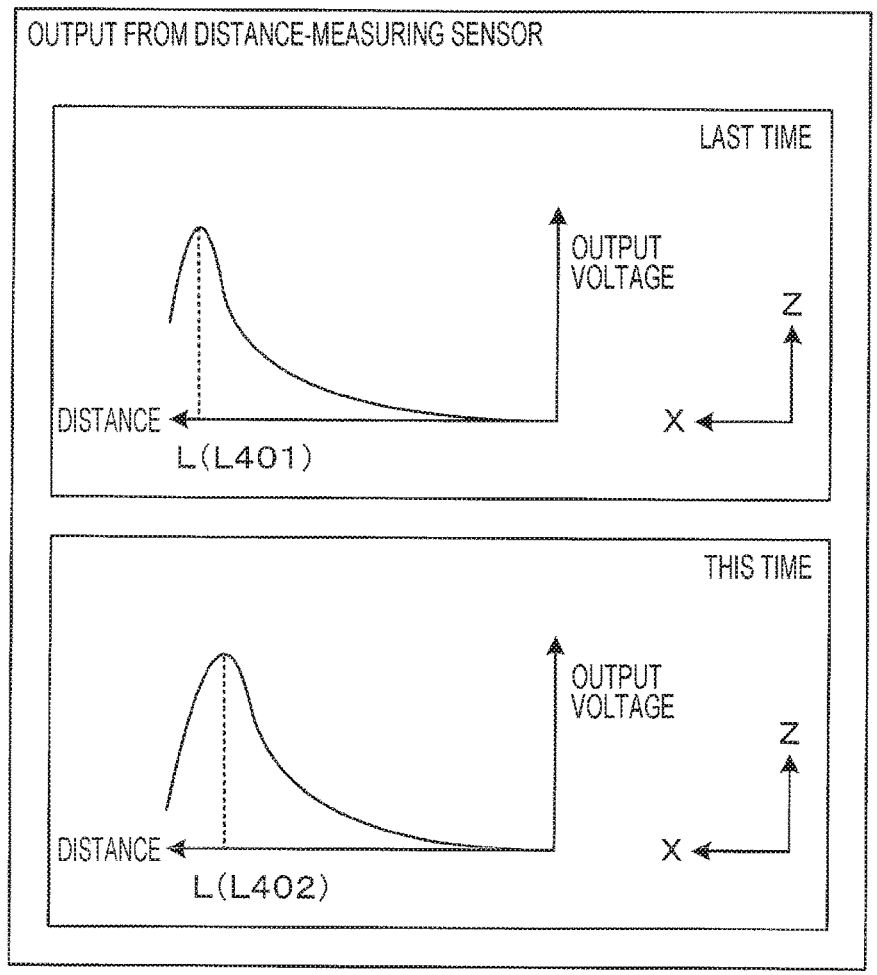

FIG. 26 is a view showing outputs from a distance-measuring sensor 42 in a case where an obstacle 100 within a monitoring area 100 is a movable body 200 (a person 200A), in the autonomous traveling apparatus 1 according to the fourth embodiment of the present invention.

Figure 27:
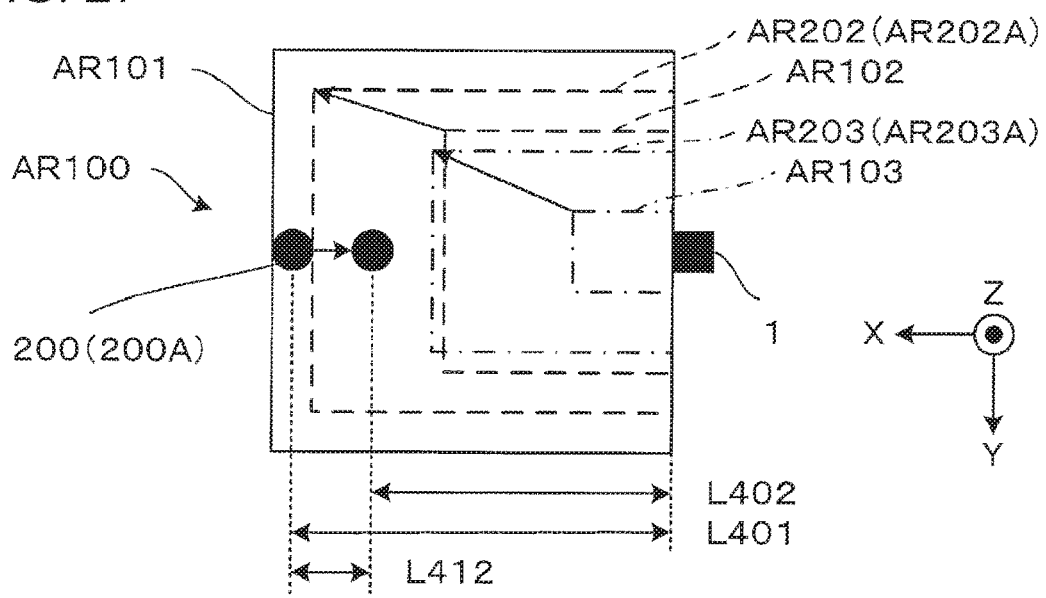

FIG. 27 is a view showing the monitoring area 100 in the case where the obstacle 100 within the monitoring area 100 is the movable body 200 (the person 200A), in the autonomous traveling apparatus 1 according to the fourth embodiment of the present invention.

Figure 28:
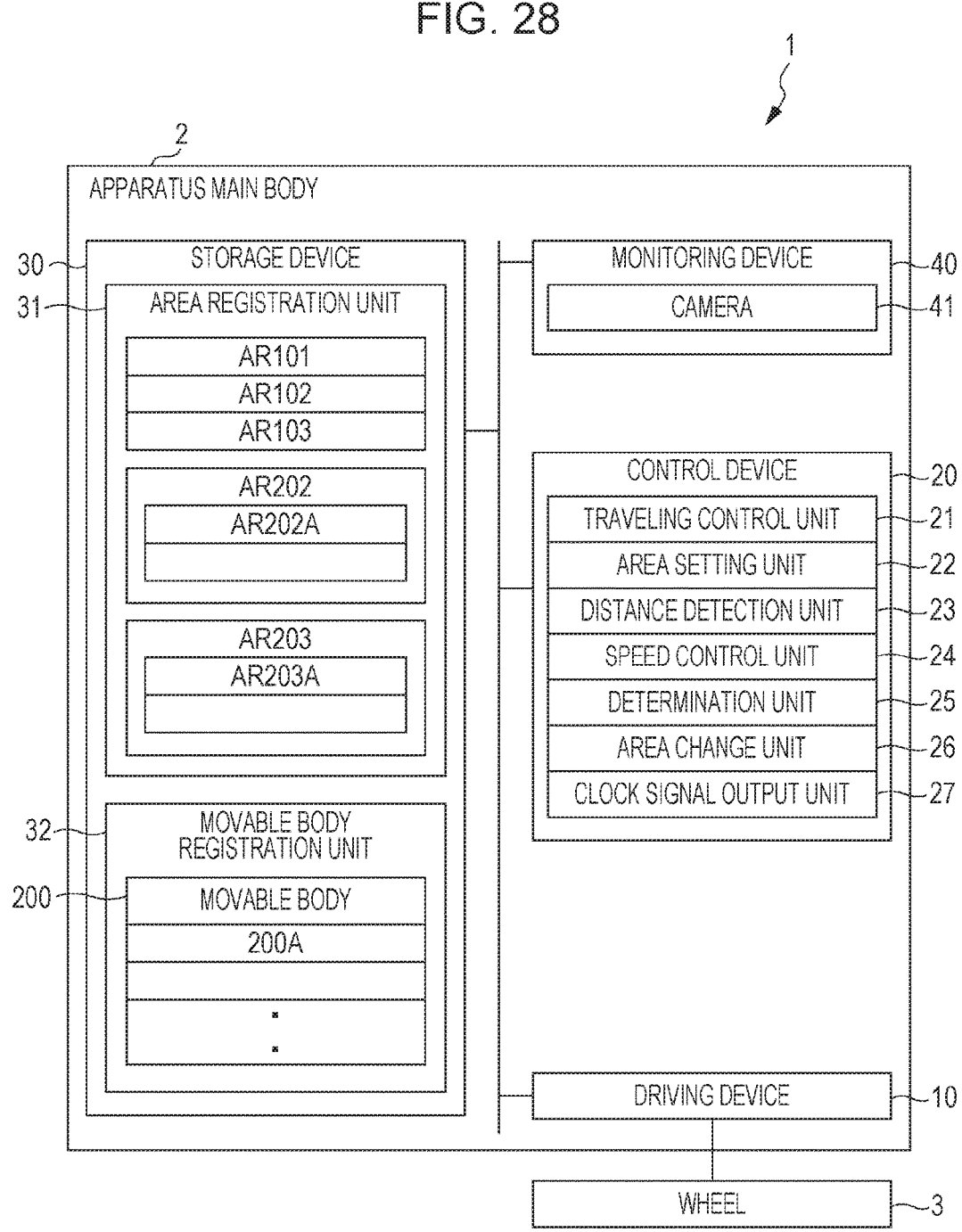

FIG. 28 is a block diagram showing the configuration of an autonomous traveling apparatus 1 according to a fifth embodiment of the present invention.

Figure 29:
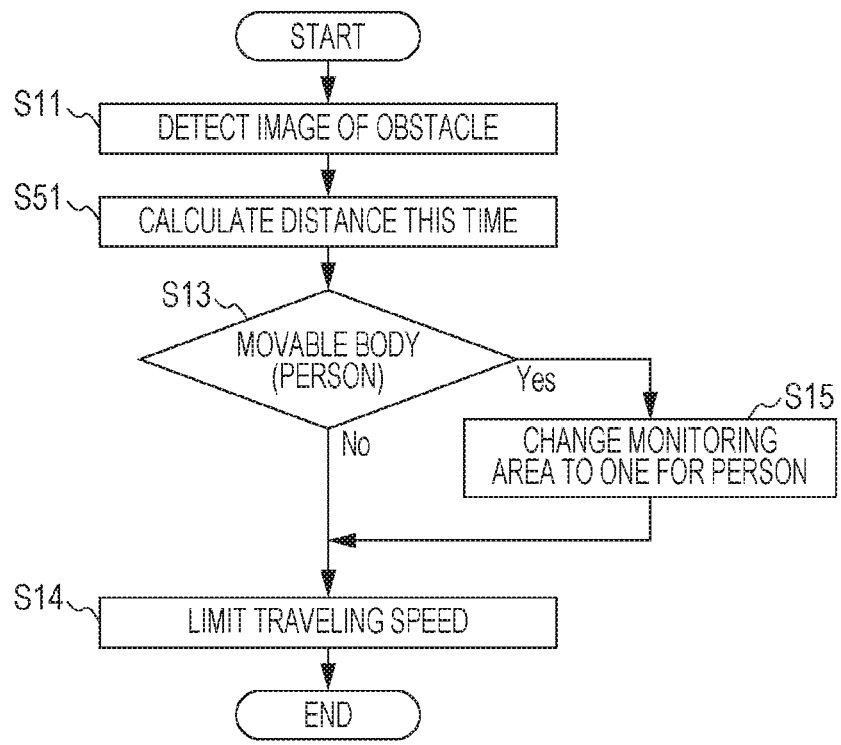

FIG. 29 is a flowchart showing the operation of the autonomous traveling apparatus 1 according to the fifth embodiment of the present invention.

Figure 30:
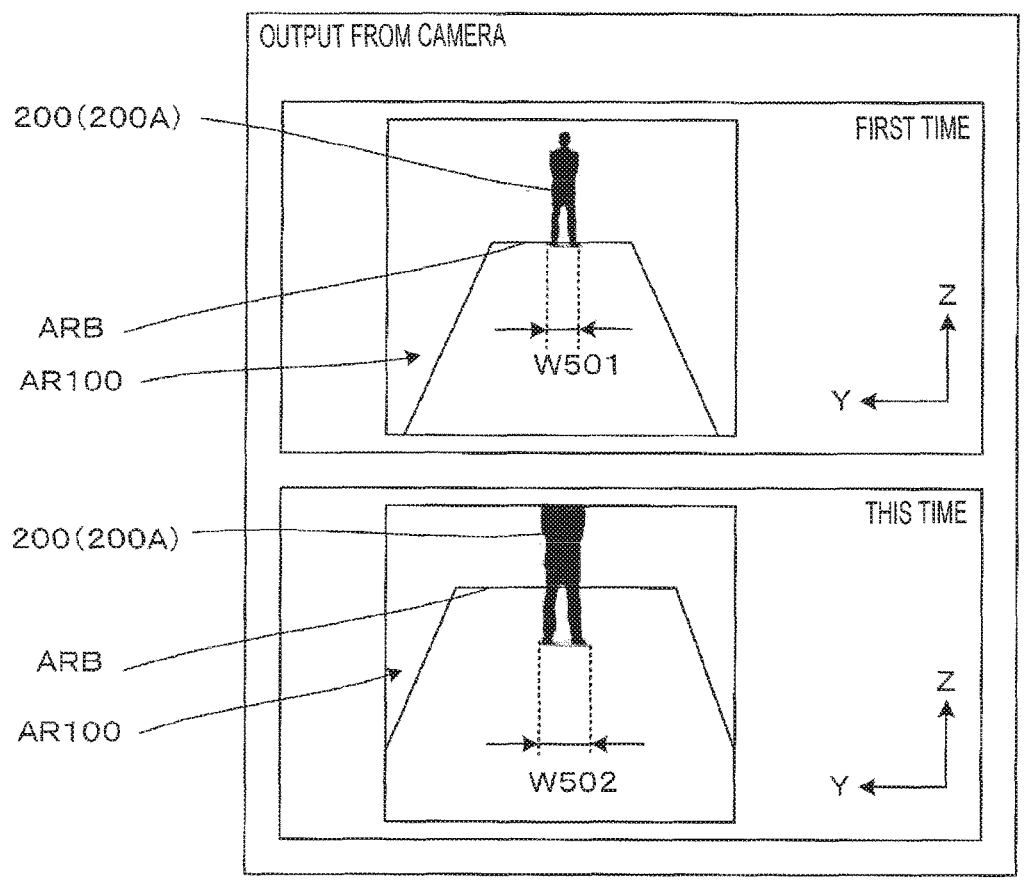

FIG. 30 is a view showing outputs from a distance-measuring sensor 42 in a case where an obstacle 100 within a monitoring area 100 is a movable body 200 (a person 200A), in the autonomous traveling apparatus 1 according to the fifth embodiment of the present invention.

Figure 31:
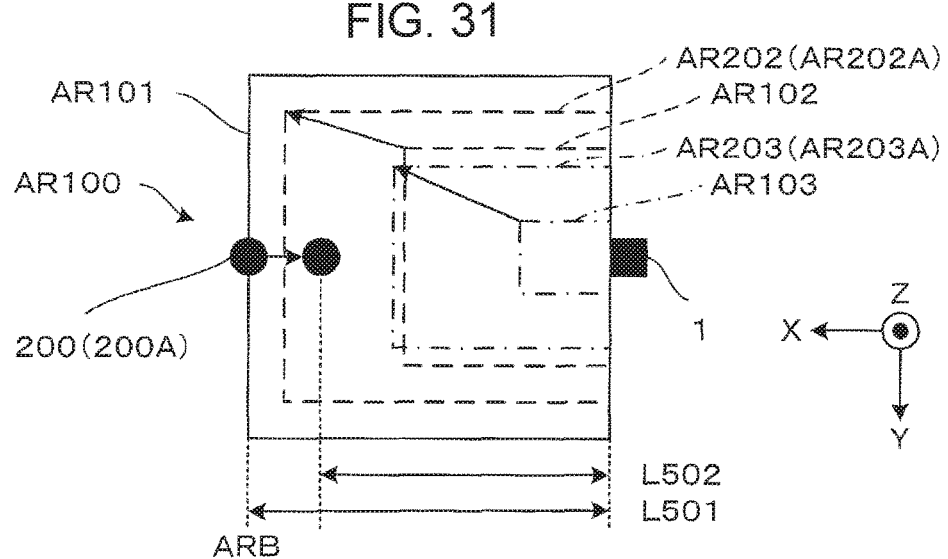

FIG. 31 is a view showing the monitoring area 100 in the case where the obstacle 100 within the monitoring area 100 is the movable body 200 (the person 200A), in the autonomous traveling apparatus 1 according to the fifth embodiment of the present invention.

Figure 32:
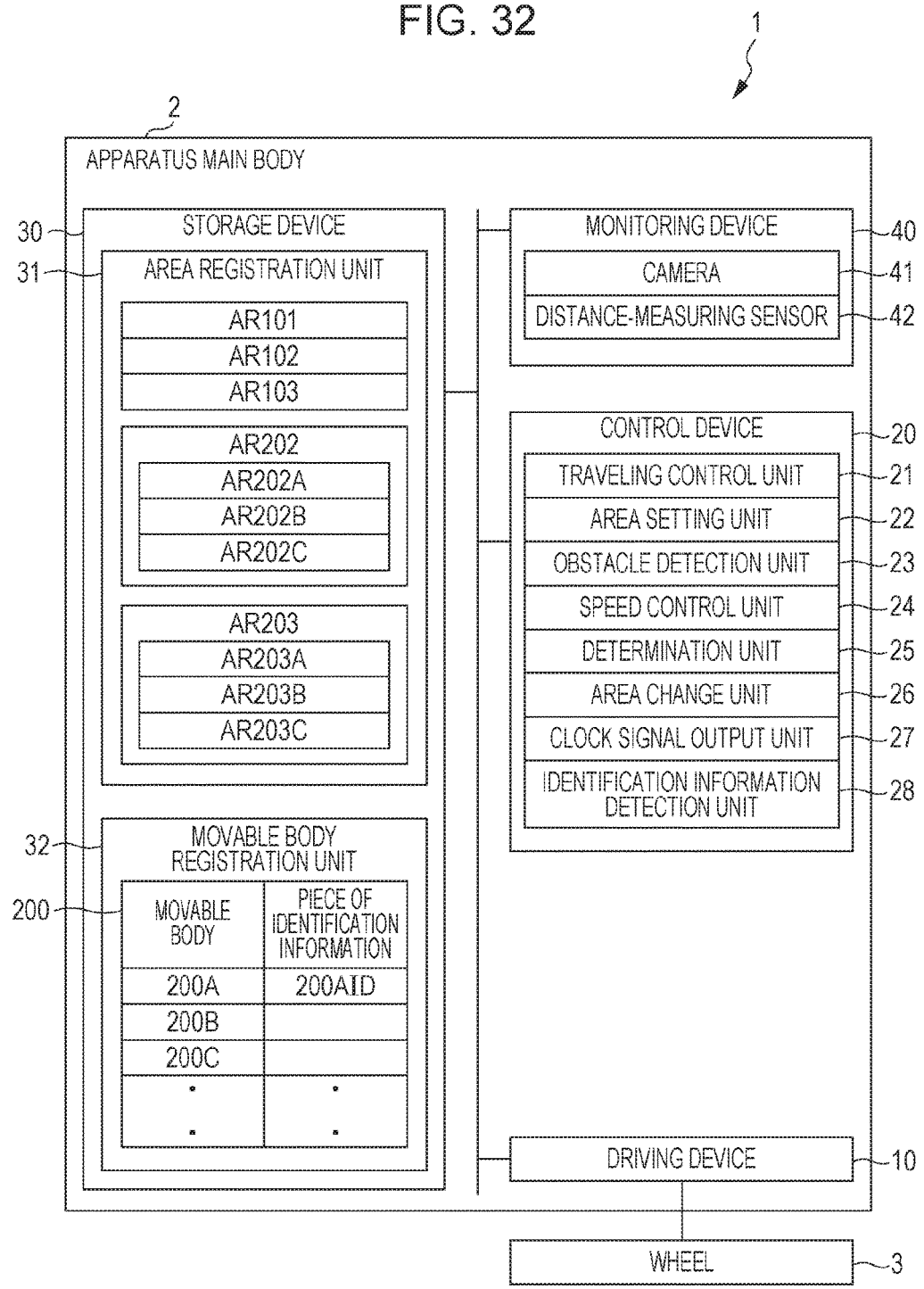

FIG. 32 is a block diagram showing the configuration of an autonomous traveling apparatus 1 according to a sixth embodiment of the present invention.

Figure 33:
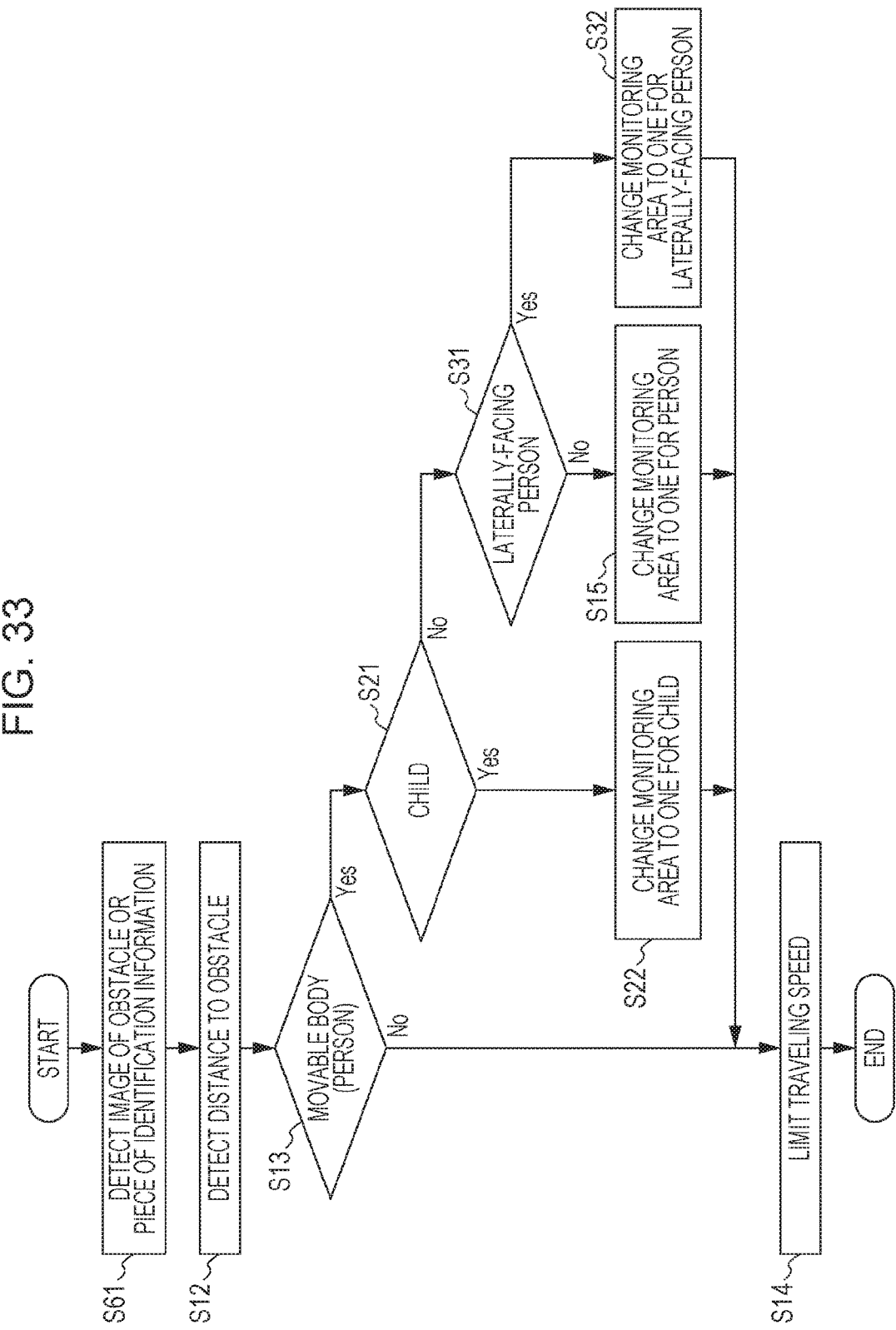

FIG. 33 is a flowchart showing the operation of the autonomous traveling apparatus 1 according to the sixth embodiment of the present invention.

Figure 34:
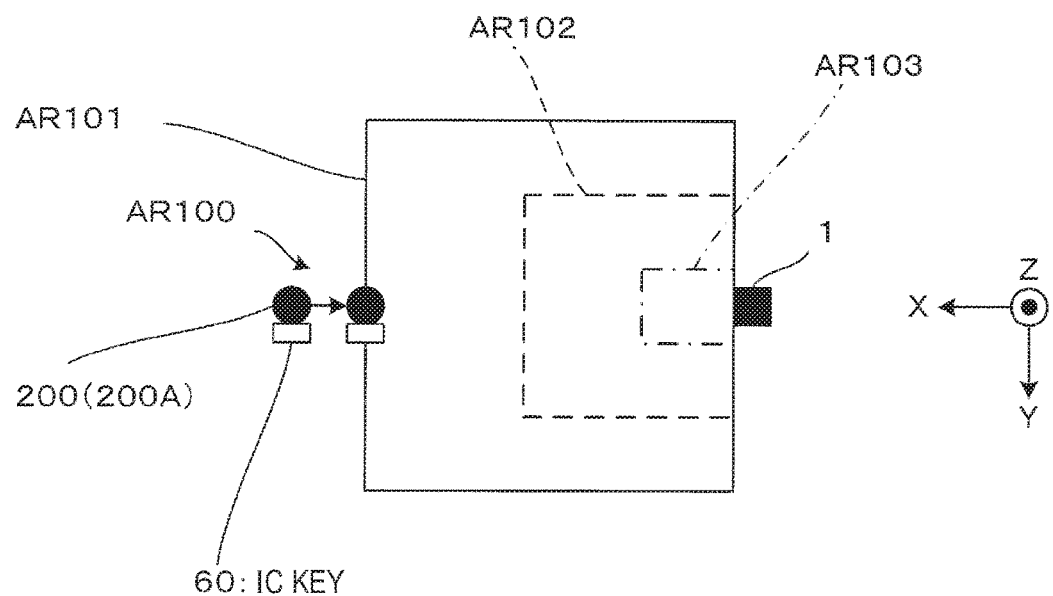

FIG. 34 is a view showing a monitoring area 100 in a case where an obstacle 100 within the monitoring area 100 is a movable body 200 (a person 200A), in the autonomous traveling apparatus 1 according to the sixth embodiment of the present invention.

Figure 35:
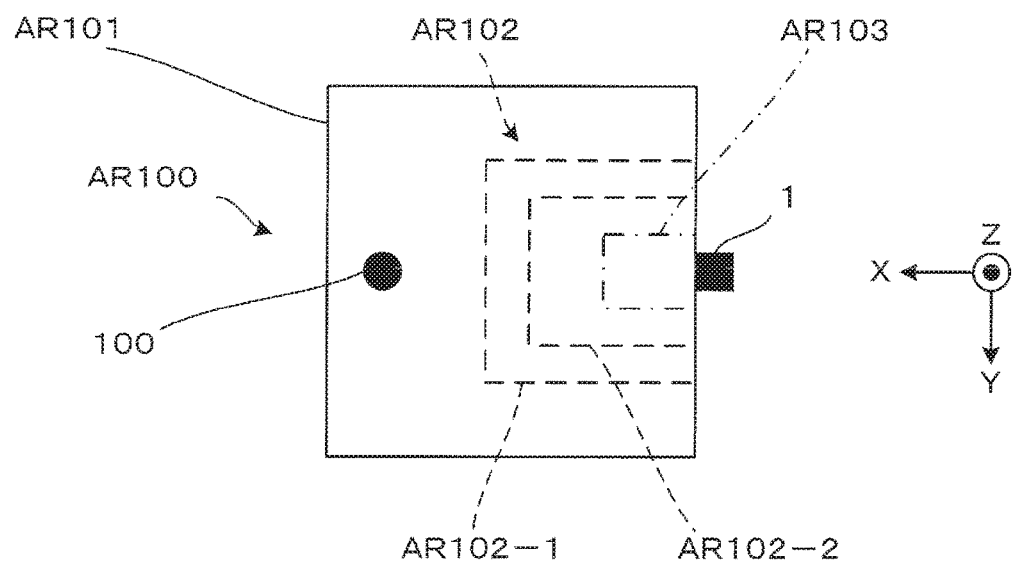

FIG. 35 is a view showing a monitoring area 100 for an autonomous traveling apparatus 1 according to a seventh embodiment of the present invention.

DESCRIPTION OF EMBODIMENTS

Embodiments of the present invention will be described below with reference to the drawings.

First Embodiment

Figure 2:
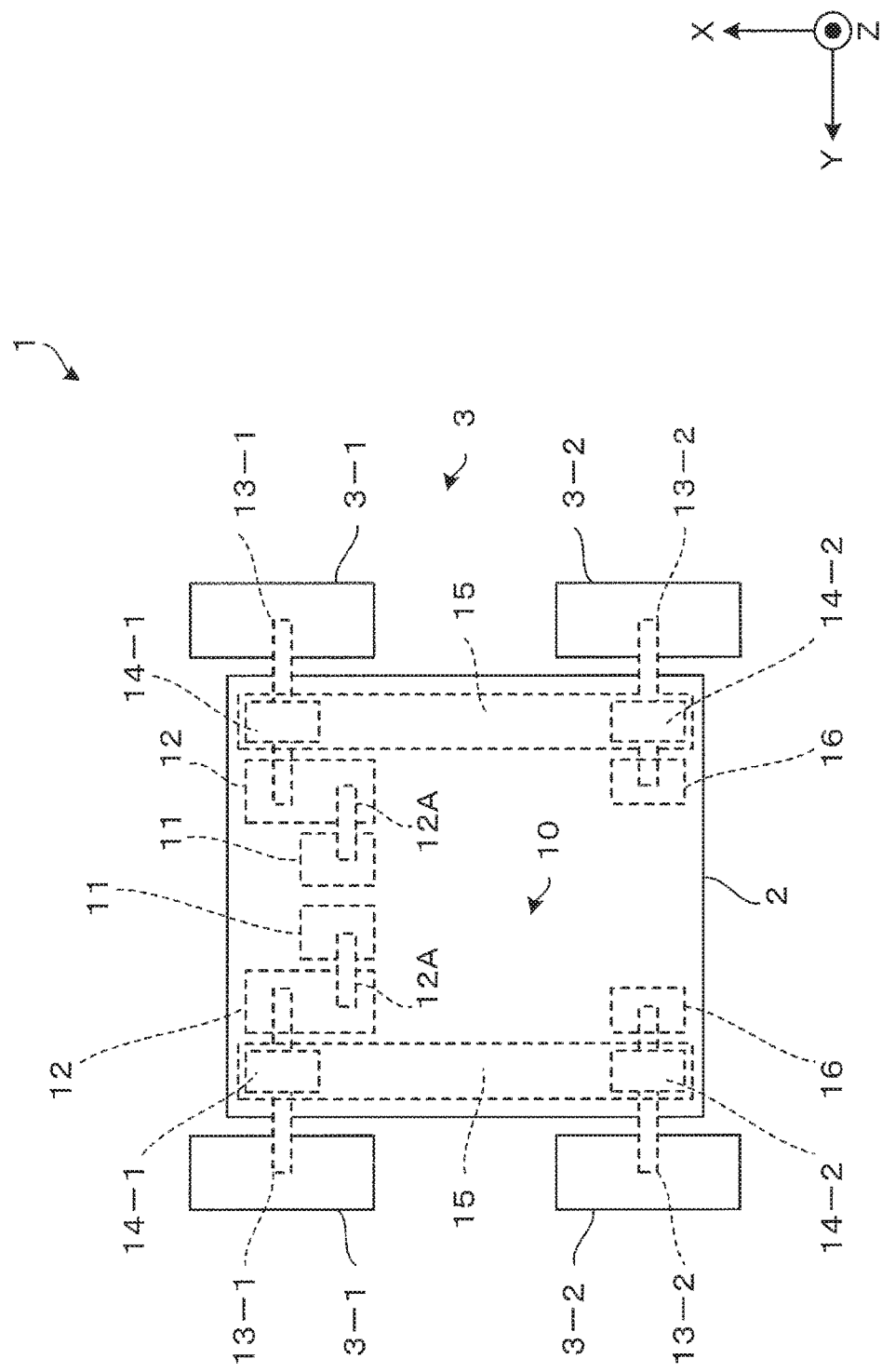
FIG. 2 is a top view of the autonomous traveling apparatus 1 according to the first embodiment of the present invention.

FIG. 1 is a side view of an autonomous traveling apparatus 1 according to a first embodiment of the present invention. FIG. 2 is a top view of the autonomous traveling apparatus 1 according to the first embodiment of the present invention. As shown in FIGS. 1 and 2, the autonomous traveling apparatus 1 includes an apparatus main body 2, a driving device 10, and four wheels 3. In the present embodiment, of the four wheels 3, left and right front wheels 3-1 are drive wheels, and left and right rear wheels 3-2 are idler wheels.

The driving device 10 includes left and right electric motors 11, left and right transmissions 12, left and right front wheel shafts 13-1, left and right rear wheel shafts 13-2, left and right front wheel sprockets 14-1, left and right rear wheel sprockets 14-2, left and right belts 15, and left and right bearings 16.

The left and right front wheel shafts 13-1 have respective one ends connected to the left and right front wheels 3-1 and the respective other ends connected to the left and right transmissions 12-1. The left and right transmissions 12 are connected to the left and right electric motors 11, respectively. The left and right electric motors 11 are controlled by a control device 20 (to be described later) (see FIG. 3).

The left and right rear wheel shafts 13-2 have respective one ends connected to the left and right rear wheels 3-2 and the respective other ends connected to the left and right bearings 16.

The left-side front wheel shaft 13-1 and the left-side rear wheel shaft 13-2 are provided at respective centers of the left-side front wheel sprocket 14-1 and the left-side rear wheel sprocket 14-2. The left-side belt 15 is provided around outer peripheries of the left-side front wheel sprocket 14-1 and the left-side rear wheel sprocket 14-2, and the left-side front wheel 3-1 (drive wheel) and the left-side rear wheel 3-2 (idler wheel) are coupled by the left-side belt 15.

The left-side front wheel 3-1 (drive wheel) receives power from the left-side electric motor 11 via the left-side transmission 12-1 and rotates with the left-side front wheel shaft 13-1 and the left-side front wheel sprocket 14-1 based on the power. The left-side rear wheel 3-2 (idler wheel) receives rotational motion of the left-side front wheel 3-1 (drive wheel) via the left-side belt 15 and rotates with the left-side rear wheel shaft 13-2 and the left-side rear wheel sprocket 14-2 based on the rotational motion.

The right-side front wheel shaft 13-1 and the right-side rear wheel shaft 13-2 are provided at respective centers of the right-side front wheel sprocket 14-1 and the right-side rear wheel sprocket 14-2. The right-side belt 15 is provided around outer peripheries of the right-side front wheel sprocket 14-1 and the right-side rear wheel sprocket 14-2. The right-side front wheel 3-1 (drive wheel) and the right-side rear wheel 3-2 (idler wheel) are coupled by the right-side belt 15.

The right-side front wheel 3-1 (drive wheel) receives power from the right-side electric motor 11 via the right-side transmission 12-1 and rotates with the right-side front wheel shaft 13-1 and the right-side front wheel sprocket 14-1 based on the power. The right-side rear wheel 3-2 (idler wheel) receives rotational motion of the right-side front wheel 3-1 (drive wheel) via the right-side belt 15 and rotates with the right-side rear wheel shaft 13-2 and the right-side rear wheel sprocket 14-2 based on the rotational motion.

The transmission 12 includes, for example, a clutch and a gearbox. The gearbox is composed of a shaft 12A which has one end connected to the electric motor 11 and a gear (not shown) which is provided on an outer periphery of the shaft 12A, and transmits power from a power source (the electric motor 11) after changing the power in torque, the number of revolutions, and rotation direction. For this reason, the transmissions 12, the front wheel shafts 13-1 and the rear wheel shafts 13-2, the front wheel sprockets 14-1 and the rear wheel sprockets 14-2, and the belts 15 are constructed as power transmission members.

The left and right electric motors 11 transmit power to the left and right power transmission members, thereby driving the four wheels 3 and causing the apparatus main body 2 to travel or stop.

The transmissions 12 may not be included as power transmission members. In this case, the electric motors 11 and the left and right front wheel shafts 13-1 are coupled by gears (with a fixed ratio) to control the number of revolutions and the rotation direction of each electric motor 11.

Figure 3:
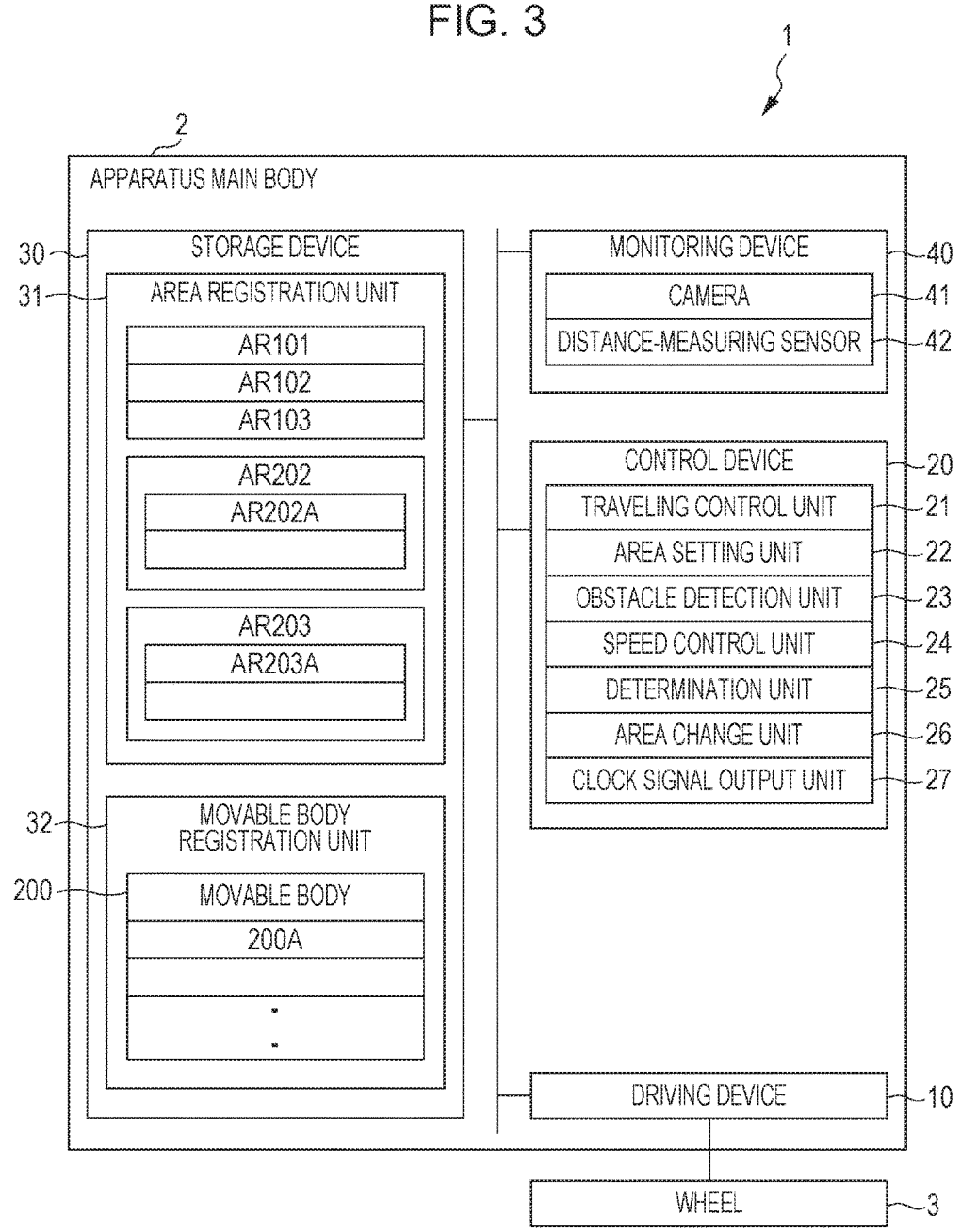
FIG. 3 is a block diagram showing the configuration of the autonomous traveling apparatus 1 according to the first embodiment of the present invention.
Figure 4:
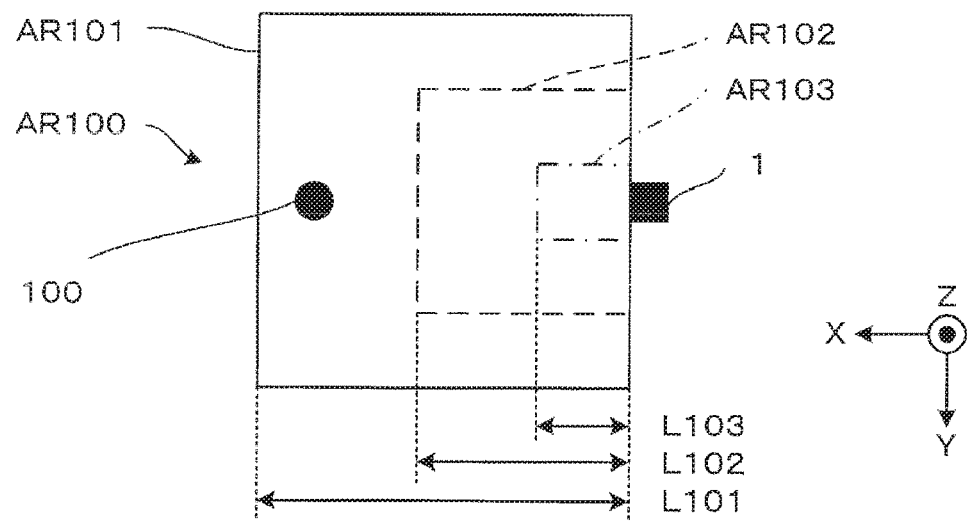
FIG. 4 is a view showing a monitoring area 100 for the autonomous traveling apparatus 1 according to the first embodiment of the present invention and showing a state in which the autonomous traveling apparatus 1 is traveling at a set speed.
Figure 5:
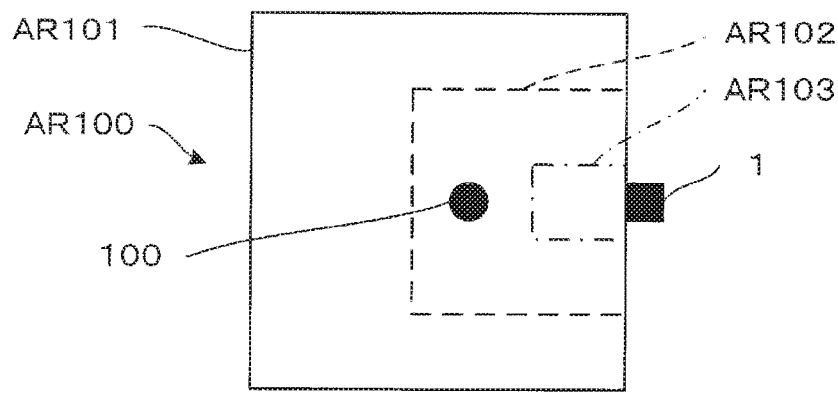
FIG. 5 is a view showing the monitoring area 100 for the autonomous traveling apparatus 1 according to the first embodiment of the present invention and showing a state in which the autonomous traveling apparatus 1 is traveling while decelerating.
Figure 6:
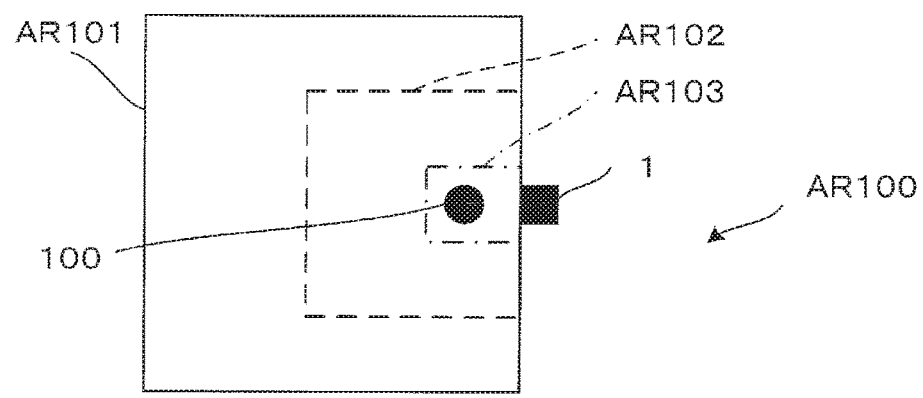
FIG. 6 is a view showing the monitoring area 100 for the autonomous traveling apparatus 1 according to the first embodiment of the present invention and showing a state in which the autonomous traveling apparatus 1 is at a stop.

FIG. 3 is a block diagram showing the configuration of the autonomous traveling apparatus 1 according to the first embodiment of the present invention. FIG. 4 is a view showing a monitoring area 100 for the autonomous traveling apparatus 1 according to the first embodiment of the present invention and showing a state in which the autonomous traveling apparatus 1 is traveling at a set speed. FIG. 5 is a view showing the monitoring area 100 for the autonomous traveling apparatus 1 according to the first embodiment of the present invention and showing a state in which the autonomous traveling apparatus 1 is traveling while decelerating. FIG. 6 is a view showing the monitoring area 100 for the autonomous traveling apparatus 1 according to the first embodiment of the present invention and showing a state in which the autonomous traveling apparatus 1 is at a stop.

As shown in FIG. 3, the apparatus main body 2 of the autonomous traveling apparatus 1 includes the control device 20, a storage device 30, and a monitoring device 40 in addition to the driving device 10. The control device 20 is a central processing unit (CPU) and controls the driving device 10, the storage device 30, and the monitoring device 40. A computer-executable computer program is stored in the storage device 30, and the control device 20 reads out and executes the computer program.

The monitoring device 40 monitors the monitoring area AR100. The monitoring area AR100 is a region which extends forward from the apparatus main body 2. As shown in FIG. 3, the monitoring device 40 includes a camera 41 and a distance-measuring sensor 42.

The camera 41 photographs an image of the monitoring area AR100 in response to a clock signal (to be described later).

The distance-measuring sensor 42 measures a distance L from the apparatus main body 2 to an obstacle 100 within the monitoring area AR100 (see FIG. 4) in response to a clock signal (to be described later).

As shown in FIG. 3, the storage device 30 includes an area registration unit 31 and a movable body registration unit 32.

In the area registration unit 31, a piece of information representing a normal traveling area AR101, a piece of information representing a deceleration area AR102, and a piece of information representing a stop area AR103 are registered.

As shown in FIG. 4, the normal traveling area AR101 is a region which extends forward from the apparatus main body 2 over a distance L101. The normal traveling area AR101 is also a region for the apparatus main body 2 to travel at the set speed.

As shown in FIG. 4, the deceleration area AR102 is provided between the normal traveling area AR101 and the apparatus main body 2. The deceleration area AR102 is a region which extends forward from the apparatus main body 2 over a distance L102. The distance L102 is shorter than the distance L101. As shown in FIG. 5, the deceleration area AR102 is also a region for the apparatus main body 2 traveling at the set speed to travel while decelerating.

As shown in FIG. 4, the stop area AR103 is provided between the deceleration area AR102 and the apparatus main body 2. The stop area AR103 is a region which extends forward from the apparatus main body 2 over a distance L103. The distance L103 is shorter than the distance L102.

As shown in FIG. 6, the stop area AR103 is also a region for the apparatus main body 2 traveling while decelerating to stop.

Pieces of information representing deceleration areas AR202 (AR202A, . . . ) for movable body and pieces of information representing stop areas AR203 (AR203A, . . . ) for movable body are further registered in the area registration unit 31.

The deceleration area AR202 for movable body is provided between the normal traveling area AR101 and the apparatus main body 2 (see FIG. 11). The deceleration area AR202 for movable body is a region which extends forward from the apparatus main body 2 over a distance L202 (see FIG. 11). The distance L202 is shorter than the distance L101 and longer than the distance L102. The deceleration area AR202 for movable body is also a region for the apparatus main body 2 traveling at the set speed to travel while decelerating. That is, the deceleration area AR202 for movable body is wider than the deceleration area AR102 and narrower than the normal traveling area AR101.

The stop area AR203 for movable body is provided between the deceleration area AR202 for movable body and the apparatus main body 2 (see FIG. 11). The stop area AR203 for movable body is a region which extends forward from the apparatus main body 2 over a distance L203 (see FIG. 11). The distance L203 is shorter than the distance L102 and longer than the distance L103. The stop area AR203 for movable body is also a region for the apparatus main body 2 traveling while decelerating to stop. That is, the stop area AR203 for movable body is wider than the stop area AR103 and narrower than the deceleration area AR202 for movable body.

The deceleration areas AR202 for movable body and the stop areas AR203 for movable body vary for different types of movable bodies 200 (200A, . . . ).

As shown in FIG. 3, respective images representing a plurality of types of movable bodies 200 (200A, . . . ) are registered in the movable body registration unit 32.

For example, an image of the movable body 200A among the images of the plurality of types of movable bodies 200 registered in the movable body registration unit 32 is an image representing the person 200A. For the image representing the person 200A, the deceleration areas AR202 for movable body and the stop areas AR203 for movable body registered in the area registration unit 31 include the deceleration area AR202A for person and the stop area AR203A for person, respectively.

The deceleration area AR202A for person is a region which extends forward from the apparatus main body 2 over a distance L202A, and the distance L202A is, for example, equal to the above-described distance L202 (see FIG. 11).

The stop area AR203A for person is a region which extends forward from the apparatus main body 2 over a distance L203A, and the distance L203A is, for example, equal to the above-described distance L203 (see FIG. 11).

As shown in FIG. 3, the control device 20 includes a traveling control unit 21, an area setting unit 22, an obstacle detection unit 23, a speed control unit 24, a determination unit 25, an area change unit 26, and a clock signal output unit 27.

The clock signal output unit 27 outputs a clock signal.

The traveling control unit 21 causes the apparatus main body 2 to travel normally until the obstacle 100 (to be described later) is detected. More specifically, the traveling control unit 21 causes the apparatus main body 2 to travel autonomously along a monitoring route set in advance (in a movement direction set in advance) at a set speed set in advance by controlling the driving device 10.

For the monitoring area AR100, the normal traveling area AR101, the deceleration area AR102, and the stop area AR103 are set in the area setting unit 22.

The obstacle detection unit 23 receives an output from the camera 41 and an output from the distance-measuring sensor 42 as synchronized data in response to a clock signal from the clock signal output unit 27. The obstacle detection unit 23 detects an image of the obstacle 100, which is different from a background image, from an image of the monitoring area AR100 which is photographed by the camera 41. The obstacle detection unit 23 detects the distance L measured by the distance-measuring sensor 42.

The speed control unit 24 controls a traveling speed of the apparatus main body 2 if the obstacle 100 is detected. More specifically, if the obstacle 100 is detected by the obstacle detection unit 23, the speed control unit 24 limits the traveling speed of the apparatus main body 2 on the basis of the normal traveling area AR101, the deceleration area AR102, and the stop area AR103 within the monitoring area AR100 that are set in the area setting unit 22 and the distance L from the apparatus main body 2 to the obstacle 100 within the monitoring area AR100. That is, the speed control unit 24 controls the traveling speed of the apparatus main body 2 such that the apparatus main body 2 does not collide with the obstacle 100, as the apparatus main body 2 approaches the obstacle 100.

The determination unit 25 determines whether the obstacle 100 detected by the obstacle detection unit 23 is the movable body 200 and outputs a determination result. At this time, if an image of the obstacle 100 detected by the obstacle detection unit 23 coincides with an image of one movable body among the images of the plurality of types of movable bodies 200 registered in the movable body registration unit 32, the determination unit 25 outputs a determination result indicating that the obstacle 100 detected by the obstacle detection unit 23 is the movable body 200.

If a determination result indicates that the obstacle 100 is the movable body 200, the area change unit 26 reads out the deceleration area AR202 for movable body and the stop area AR203 for movable body registered in the area registration unit 31 of the storage device 30 and changes the deceleration area AR102 and the stop area AR103 within the monitoring area AR100 that are set in the area setting unit 22 to the deceleration area AR202 for movable body and the stop area AR203 for movable body, respectively.

In this case, the speed control unit 24 limits the traveling speed of the apparatus main body 2 on the basis of the normal traveling area AR101, the deceleration area AR202 for movable body, and the stop area AR203 for movable body within the monitoring area AR100 that are set in the area setting unit 22 and the distance L measured by the distance-measuring sensor 42 (the distance L from the apparatus main body 2 to the movable body 200 within the monitoring area AR100). That is, the speed control unit 24 controls the traveling speed of the apparatus main body 2 such that the apparatus main body 2 does not collide with the movable body 200, as the apparatus main body 2 approaches the movable body 200.

As described above, examples of a movable body include the person 200A. For example, an image of each of at least one movable body among the images of the plurality of types of movable bodies 200 registered in the movable body registration unit 32 refers to an image of the person 200A. For identification of (determination as) a person which regularly uses a monitoring route to be monitored by the autonomous traveling apparatus 1, a person image determined in advance may be used as an image of the person 200A. If determination as a person by a feature point in, for example, the contour or shape of a face is enough, an arbitrarily determined person image as a sample image may be used as an image of the person 200A.

Figure 7:
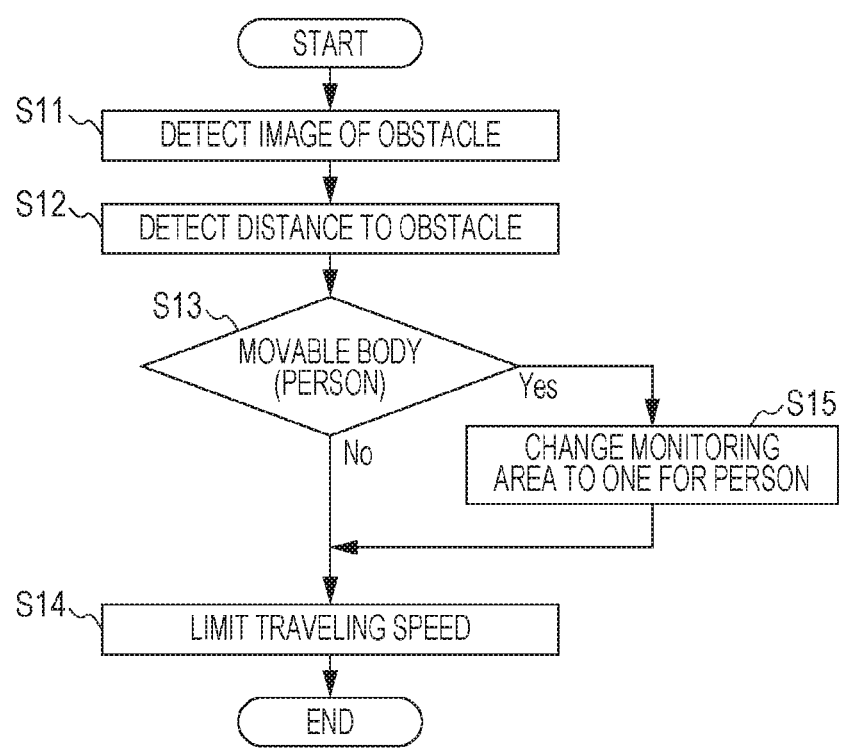
FIG. 7 is a flowchart showing the operation of the autonomous traveling apparatus 1 according to the first embodiment of the present invention.
Figure 8:
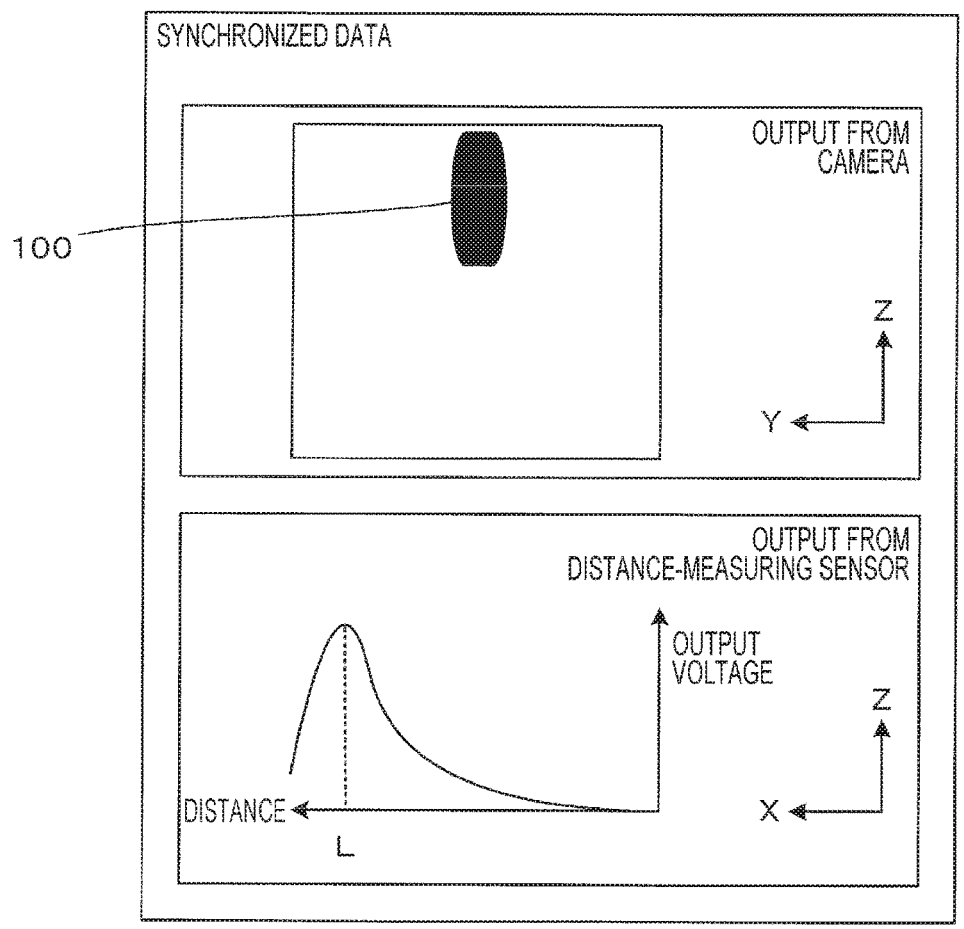
FIG. 8 is a view showing synchronized data (an output from a camera 41 and an output from a distance-measuring sensor 42) in a case where an obstacle 100 within the monitoring area 100 is not a movable body, in the autonomous traveling apparatus 1 according to the first embodiment of the present invention.
Figure 9:
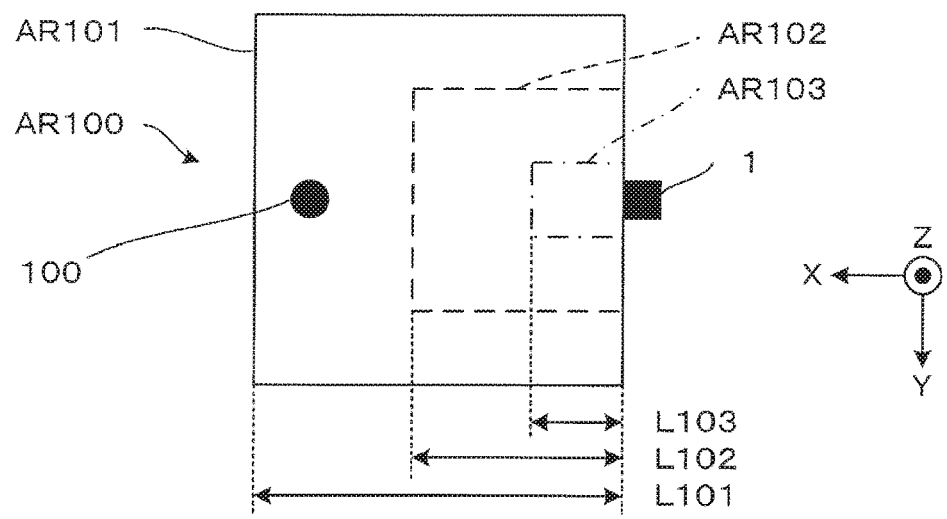
FIG. 9 is a view showing the monitoring area 100 in the case where the obstacle 100 within the monitoring area 100 is not a movable body, in the autonomous traveling apparatus 1 according to the first embodiment of the present invention.

FIG. 7 is a flowchart showing the operation of the autonomous traveling apparatus 1 according to the first embodiment of the present invention. FIG. 8 is a view showing synchronized data (an output from the camera 41 and an output from the distance-measuring sensor 42) in a case where the obstacle 100 within the monitoring area 100 is not a movable body, in the autonomous traveling apparatus 1 according to the first embodiment of the present invention. FIG. 9 is a view showing the monitoring area 100 in the case where the obstacle 100 within the monitoring area 100 is not a movable body, in the autonomous traveling apparatus 1 according to the first embodiment of the present invention. FIG. 10 is a view showing synchronized data (an output from the camera 41 and an output from the distance-measuring sensor 42) in a case where the obstacle 100 within the monitoring area 100 is the movable body 200 (the person 200A), in the autonomous traveling apparatus 1 according to the first embodiment of the present invention. FIG. 11 is a view showing the monitoring area 100 in the case where the obstacle 100 within the monitoring area 100 is the movable body 200 (the person 200A), in the autonomous traveling apparatus 1 according to the first embodiment of the present invention.

The camera 41 first photographs an image of the monitoring area AR100 in response to a clock signal from the clock signal output unit 27. The distance-measuring sensor 42 measures the distance L from the apparatus main body 2 to the obstacle 100 within the monitoring area AR100 in response to a clock signal. In this case, the obstacle detection unit 23 receives an output from the camera 41 and an output from the distance-measuring sensor 42 as synchronized data (see FIGS. 8 and 10) in response to a clock signal. As shown in FIGS. 8 and 10, an output from the camera 41 refers to an image of the monitoring area AR100. As shown in FIGS. 8 and 10, an output from the distance-measuring sensor 42 is a piece of data indicating the relationship between an output voltage and a distance, and the distance when the output voltage has a peak value represents the distance L.

As shown in FIG. 7, the obstacle detection unit 23 detects an image of the obstacle 100, which is different from a background image, from an image of the monitoring area AR100 which is photographed by the camera 41 (step S11). The obstacle detection unit 23 also detects the distance L measured by the distance-measuring sensor 42 (the distance L from the apparatus main body 2 to the obstacle 100 within the monitoring area AR100) (step S12).

The determination unit 25 determines whether the obstacle 100 within the monitoring area 100 is a movable body (step S13). More specifically, the determination unit 25 determines whether the image of the obstacle 100 detected by the obstacle detection unit 23 coincides with an image representing a movable body (person) among the images of the plurality of types of movable bodies 200 registered in the movable body registration unit 32.

For example, the image of the obstacle 100 detected by the obstacle detection unit 23 may coincide with none of the images of the plurality of types of movable bodies 200 registered in the movable body registration unit 32. That is, the obstacle 100 within the monitoring area 100 may not be a movable body (No in step S13) (see FIGS. 8 and 9). In this case, the determination unit 25 outputs a determination result indicating that the obstacle 100 detected by the obstacle detection unit 23 is not a movable body.

In this case, the speed control unit 24 limits the traveling speed of the apparatus main body 2 on the basis of the normal traveling area AR101, the deceleration area AR102, and the stop area AR103 within the monitoring area AR100 that are set in the area setting unit 22 and the distance L measured by the distance-measuring sensor 42 (the distance L from the apparatus main body 2 to the obstacle 100 within the monitoring area AR100) (step S14). That is, the speed control unit 24 controls the traveling speed of the apparatus main body 2 such that the apparatus main body 2 does not collide with the obstacle 100, as the apparatus main body 2 approaches the obstacle 100.

On the other hand, the image of the obstacle 100 detected by the obstacle detection unit 23 may coincide with an image representing the person 200A among the images of the plurality of types of movable bodies 200 registered in the movable body registration unit 32. That is, the obstacle 100 within the monitoring area 100 may be the movable body 200 (the person 200A) (Yes in step S13) (see FIGS. 10 and 11). In this case, the determination unit 25 outputs a determination result indicating that the obstacle 100 detected by the obstacle detection unit 23 is the person 200A. If the determination result indicates that the obstacle 100 is the person 200A, the area change unit 26 reads out the deceleration area AR202A for person and the stop area AR203A for person as the deceleration area AR202 for movable body and the stop area AR203 for movable body registered in the area registration unit 31 of the storage device 30 and changes the deceleration area AR102 and the stop area AR103 within the monitoring area AR100 that are set in the area setting unit 22 to the deceleration area AR202A for person as the deceleration area AR202 for movable body and the stop area AR203A for person as the stop area AR203 for movable body, respectively (step S15).

In this case, the speed control unit 24 limits the traveling speed of the apparatus main body 2 on the basis of the normal traveling area AR101, the deceleration area AR202A for person, and the stop area AR203A for person within the monitoring area AR100 that are set in the area setting unit 22 and the distance L measured by the distance-measuring sensor 42 (the distance L from the apparatus main body 2 to the movable body 200 within the monitoring area AR100) (step S14). That is, the speed control unit 24 controls the traveling speed of the apparatus main body 2 such that the apparatus main body 2 does not collide with the adult 200A, as the apparatus main body 2 approaches the adult 200A.

After that, in step S14, if the person 200A moves, and the obstacle detection unit 23 no longer detects an image of the obstacle 100 (the person 200A), the obstacle detection unit 23 outputs a normal traveling request signal to the area change unit 26. The area change unit 26 reads out the deceleration area AR102 and the stop area AR103 registered in the area registration unit 31 of the storage device 30 and changes the deceleration area AR202A for person and the stop area AR203A for person within the monitoring area AR100 that are set in the area setting unit 22 to the deceleration area AR102 and the stop area AR103, respectively, in response to the normal traveling request signal. That is, the area change unit 26 changes the settings in the area setting unit 22 back to the deceleration area AR102 and the stop area AR103.

As can be seen from the above description, in the autonomous traveling apparatus 1 according to the first embodiment of the present invention, the traveling control unit 21 causes the apparatus main body 2 to travel autonomously at the set speed, and the monitoring device 40 monitors the monitoring area AR100. For the monitoring area AR100, the normal traveling area AR101, the deceleration area AR102, and the stop area AR103 are set in the area setting unit 22. The obstacle detection unit 23 detects the obstacle 100 present in the monitoring area AR100. If the obstacle 100 is detected by the obstacle detection unit 23, the speed control unit 24 limits the traveling speed of the apparatus main body 2 on the basis of the monitoring area AR100 set in the area setting unit 22 and the distance L from the apparatus main body 2 to the obstacle 100 within the monitoring area AR100. The determination unit 25 determines whether the obstacle 100 detected by the obstacle detection unit 23 is the movable body 200 and outputs a determination result. If the determination result indicates that the obstacle 100 is the movable body 200, the area change unit 26 changes the deceleration area AR102 and the stop area AR103 within the monitoring area AR100 that are set in the area setting unit 22 to the deceleration area AR202 for movable body and the stop area AR203 for movable body, respectively. As described above, if the obstacle 100 is the movable body 200, the autonomous traveling apparatus 1 according to the first embodiment of the present invention limits the traveling speed without waiting for an instruction from a monitoring center as in PTL 1. Thus, the autonomous traveling apparatus 1 according to the first embodiment of the present invention can support even a case where the obstacle 100 is the movable body 200, in limiting the traveling speed in response to detection of the obstacle 100.

In the autonomous traveling apparatus 1 according to the first embodiment of the present invention, the respective images representing the plurality of types of movable bodies 200 are registered in the movable body registration unit 32, and the monitoring device 40 includes the camera 41 that photographs an image of the monitoring area AR100 and the distance-measuring sensor 42 that measures the distance L from the apparatus main body 2 to the obstacle 100 within the monitoring area AR100. For this reason, the obstacle detection unit 23 detects an image of the obstacle 100, which is different from a background image, from an image of the monitoring area AR100 which is photographed by the camera 41. If the image of the obstacle 100 detected by the obstacle detection unit 23 coincides with an image of one movable body among the images of the plurality of types of movable bodies 200 registered in the movable body registration unit 32, the determination unit 25 outputs a determination result indicating that the obstacle 100 detected by the obstacle detection unit 23 is the movable body 200. If the determination result indicates that the obstacle 100 is the movable body 200, the area change unit 26 changes the deceleration area AR102 and the stop area AR103 within the monitoring area AR100 that are set in the area setting unit 22 to the deceleration area AR202 for movable body and the stop area AR203 for movable body, respectively. As described above, in the autonomous traveling apparatus 1 according to the first embodiment of the present invention, whether the obstacle 100 is the movable body 200 can be achieved by the camera 41 and the obstacle detection unit 23, and the distance L from the apparatus main body 2 to the obstacle 100 within the monitoring area AR100 can be achieved by the distance-measuring sensor 42.

In the autonomous traveling apparatus 1 according to the first embodiment of the present invention, the deceleration areas AR202 for movable body and the stop areas AR203 for movable body vary for different types of movable bodies 200.

For example, in the autonomous traveling apparatus 1 according to the first embodiment of the present invention, an image of each of at least one movable body among the images of the plurality of types of movable bodies 200 registered in the movable body registration unit 32 represents the person 200A. If an image of the obstacle 100 which is detected by the obstacle detection unit 23 coincides with an image representing the person 200A among the images of the plurality of types of movable bodies 200 registered in the movable body registration unit 32, the determination unit 25 outputs a determination result indicating that the obstacle 100 detected by the obstacle detection unit 23 is the person 200A. If the determination result indicates that the obstacle 100 is the person 200A, the area change unit 26 changes the deceleration area AR102 and the stop area AR103 within the monitoring area AR100 that are set in the area setting unit 22 to the deceleration area AR202A for person and the stop area AR203A for person, respectively. If the obstacle 100 is the person 200A, the person 200A may get injured when the person 200A comes into contact or collides with the apparatus main body 2. Thus, if the obstacle 100 is the person 200A, the autonomous traveling apparatus 1 according to the first embodiment of the present invention changes the monitoring area AR100 from the monitoring area AR100 for object (with the normal traveling area AR101, the deceleration area AR102, and the stop area AR103) to a monitoring area for person (with the normal traveling area AR101, the deceleration area AR202A for person, and the stop area AR203A for person). This makes it possible to set a traveling speed for the person 200A under a stricter standard than that for a traveling speed for an object (the obstacle 100).

Second Embodiment

FIG. 12 is a block diagram showing the configuration of an autonomous traveling apparatus 1 according to a second embodiment of the present invention. Differences from the first embodiment will be described in the second embodiment.

As shown in FIG. 12, for example, an image of a movable body 200B among images of a plurality of types of movable bodies 200 which are registered in a movable body registration unit 32 is an image representing a child. For the image representing the child 200B, deceleration areas AR202 for movable body and stop areas AR203 for movable body which are registered in an area registration unit 31 include a deceleration area AR202B for child and a stop area AR203B for child, respectively.

The deceleration area AR202B for child is provided between a normal traveling area AR101 and an apparatus main body 2 (see FIG. 18). The deceleration area AR202B for child is a region which extends forward from the apparatus main body 2 over a distance L202B (see FIG. 18). The distance L202B is shorter than a distance L101 and longer than a distance L202A. The deceleration area AR202B for child is also a region for the apparatus main body 2 traveling at a set speed to travel while decelerating. That is, the deceleration area AR202B for child is wider than a deceleration area AR202A for person and narrower than the normal traveling area AR101.

The stop area AR203B for child is provided between the deceleration area AR202B for child and the apparatus main body 2 (see FIG. 18). The stop area AR203B for child is a region which extends forward from the apparatus main body 2 over a distance L203B (see FIG. 18). The distance L203B is shorter than the distance L202A and longer than a distance L203A. The stop area AR203B for child is also a region for the apparatus main body 2 traveling while decelerating to stop. That is, the stop area AR203B for child is wider than a stop area AR203A for person and narrower than the deceleration area AR202A for person.

As described above, if a person 200A is an adult, examples of a movable body include the child 200B in addition to the adult 200A. For example, an image of each of at least one movable body among the images of the plurality of types of movable bodies 200 registered in the movable body registration unit 32 refers to an image of the child 200B. For distinction from an image of the person 200A that regularly uses a monitoring route and identification (determination), a child image determined in advance may be used as an image of the child 200B. If determination as a child shorter than the adult 200A is enough, an arbitrarily determined child image as a sample image may be used as an image of the child 200B.

FIG. 13 is a flowchart showing the operation of the autonomous traveling apparatus 1 according to the second embodiment of the present invention. FIG. 14 is a view showing synchronized data (an output from a camera 41 and an output from a distance-measuring sensor 42) in a case where an obstacle 100 within a monitoring area 100 is the adult 200A, in the autonomous traveling apparatus 1 according to the second embodiment of the present invention. FIG. 15 is a view showing the monitoring area 100 in the case where the obstacle 100 within the monitoring area 100 is the adult 200A, in the autonomous traveling apparatus 1 according to the second embodiment of the present invention. FIG. 16 is a view showing synchronized data (an output from the camera 41 and an output from the distance-measuring sensor 42) in a case where the obstacle 100 within the monitoring area 100 is the child 200B, in the autonomous traveling apparatus 1 according to the second embodiment of the present invention. FIG. 17 is a view showing the monitoring area 100 in the case where the obstacle 100 within the monitoring area 100 is the child 200B, in the autonomous traveling apparatus 1 according to the second embodiment of the present invention.

As shown in FIG. 13, steps S11 to S13 described earlier are first executed.

For example, an image of the obstacle 100 which is detected by an obstacle detection unit 23 may be an image representing the person 200A among the images of the plurality of types of movable bodies 200 registered in the movable body registration unit 32 but may not be an image representing the child 200B. That is, the obstacle 100 within the monitoring area 100 may not be a movable body (Yes in step S13 and No in S21) (see FIGS. 14 and 15). In this case, steps S15 and S14 described earlier are executed.

On the other hand, the image of the obstacle 100 detected by the obstacle detection unit 23 may coincide with the image representing the child 200B among the images of the plurality of types of movable bodies 200 registered in the movable body registration unit 32. That is, the obstacle 100 within the monitoring area 100 may be a movable body (person), and the person may be a child (Yes in step S13 and Yes in S21) (see FIGS. 16 and 17). In this case, a determination unit 25 outputs a determination result indicating that the obstacle 100 detected by the obstacle detection unit 23 is the child 200B. If the determination result indicates that the obstacle 100 is the child 200B, an area change unit 26 reads out the deceleration area AR202B for child and the stop area AR203B for child as the deceleration area AR202 for movable body and the stop area AR203 for movable body registered in the area registration unit 31 of a storage device 30 and changes a deceleration area AR102 and a stop area AR103 within the monitoring area AR100 which are set in an area setting unit 22 to the deceleration area AR202B for child and the stop area AR203B for child, respectively (step S22).

In this case, a speed control unit 24 limits a traveling speed of the apparatus main body 2 on the basis of the normal traveling area AR101, the deceleration area AR202B for child, and the stop area AR203B for child within the monitoring area AR100 that are set in the area setting unit 22 and a distance L measured by the distance-measuring sensor 42 (the distance L from the apparatus main body 2 to the movable body 200 within the monitoring area AR100) (step S14). That is, the speed control unit 24 controls the traveling speed of the apparatus main body 2 such that the apparatus main body 2 does not collide with the child 200B, as the apparatus main body 2 approaches the child 200B.

As can be seen from the above description, in the autonomous traveling apparatus 1 according to the second embodiment of the present invention, the person 200A is an adult. If an image of the obstacle 100 detected by the obstacle detection unit 23 coincides with an image representing the child 200B among the images of the plurality of types of movable bodies 200 registered in the movable body registration unit 32, the determination unit 25 outputs a determination result indicating that the obstacle 100 detected by the obstacle detection unit 23 is the child 200B. If the determination result indicates that the obstacle 100 is the child 200B, the area change unit 26 changes the deceleration area AR102 and the stop area AR103 within the monitoring area AR100 that are set in the area setting unit 22 to the deceleration area AR202B for child and the stop area AR203B for child, respectively. If the obstacle 100 is the child 200B, the child 200B is less attentive than the adult 200A. Thus, if the obstacle 100 is the child 200B, the autonomous traveling apparatus 1 according to the second embodiment of the present invention changes the monitoring area AR100 from the monitoring area AR100 for object (with the normal traveling area AR101, the deceleration area AR102, and the stop area AR103) to a monitoring area for child (with the normal traveling area AR101, the deceleration area AR202B for child, and the stop area AR203B for child). This makes it possible to set a traveling speed for the child 200B under a stricter standard than that for a traveling speed for the person 200A (an adult).

Third Embodiment

FIG. 18 is a block diagram showing the configuration of an autonomous traveling apparatus 1 according to a third embodiment of the present invention. Differences from the second embodiment will be described in the third embodiment.

As shown in FIG. 18, for example, an image of a movable body 200C among images of a plurality of types of movable bodies 200 which are registered in a movable body registration unit 32 is an image representing a laterally-facing person. For the image representing the laterally-facing person 200C, deceleration areas AR202 for movable body and stop areas AR203 for movable body which are registered in an area registration unit 31 include a deceleration area AR202C for laterally-facing person and a stop area AR203C for laterally-facing person, respectively.

The deceleration area AR202C for laterally-facing person is provided between a normal traveling area AR101 and an apparatus main body 2 (see FIG. 23). The deceleration area AR202C for laterally-facing person is a region which extends forward from the apparatus main body 2 over a distance L202C (see FIG. 23). The distance L202C is shorter than a distance L101 and longer than a distance L202A. The deceleration area AR202C for laterally-facing person is also a region for the apparatus main body 2 traveling at a set speed to travel while decelerating. That is, the deceleration area AR202C for laterally-facing person is wider than a deceleration area AR202A for person and narrower than the normal traveling area AR101.

The stop area AR203C for laterally-facing person is provided between the deceleration area AR202C for laterally-facing person and the apparatus main body 2 (see FIG. 23). The stop area AR203C for laterally-facing person is a region which extends forward from the apparatus main body 2 over a distance L203C (see FIG. 23). The distance L203C is shorter than the distance L202A and longer than a distance L203A. The stop area AR203C for laterally-facing person is also a region for the apparatus main body 2 traveling while decelerating to stop. That is, the stop area AR203C for laterally-facing person is wider than a stop area AR203A for person and narrower than the deceleration area AR202A for person.

As described above, if a person 200A is a front-facing person (a person with a front-facing face, in particular), examples of a movable body include the laterally-facing person 200C (for example, a person with a laterally-facing face or a person moving so as to cross a monitoring area 100) in addition to the front-facing person 200A. For example, an image of each of at least one movable body among the images of the plurality of types of movable bodies 200 registered in the movable body registration unit 32 refers to an image of the laterally-facing person 200C. For identification of (determination as) a person which regularly uses a monitoring route to be monitored by the autonomous traveling apparatus 1 or if the laterally-facing person 200C is the same person as the person 200A that regularly uses the monitoring route, a person image determined in advance may be used as an image of the laterally-facing person 200C. If determination as a person by a feature point in, for example, the contour or shape of a face is enough, an arbitrarily determined person image as a sample image may be used as an image of the laterally-facing person 200C.

FIG. 19 is a flowchart showing the operation of the autonomous traveling apparatus 1 according to the third embodiment of the present invention. FIG. 20 is a view showing synchronized data (an output from a camera 41 and an output from a distance-measuring sensor 42) in a case where an obstacle 100 within the monitoring area 100 is the person 200A (a front-facing person), in the autonomous traveling apparatus 1 according to the third embodiment of the present invention. FIG. 21 is a view showing the monitoring area 100 in the case where the obstacle 100 within the monitoring area 100 is the person 200A (a front-facing person), in the autonomous traveling apparatus 1 according to the third embodiment of the present invention. FIG. 22 is a view showing synchronized data (an output from the camera 41 and an output from the distance-measuring sensor 42) in a case where the obstacle 100 within the monitoring area 100 is the laterally-facing person 200C, in the autonomous traveling apparatus 1 according to the third embodiment of the present invention. FIG. 23 is a view showing the monitoring area 100 in the case where the obstacle 100 within the monitoring area 100 is the laterally-facing person 200C, in the autonomous traveling apparatus 1 according to the third embodiment of the present invention.

As shown in FIG. 19, steps S11 to S13 described earlier are first executed.

For example, an image of the obstacle 100 which is detected by an obstacle detection unit 23 may coincide with an image representing the person 200A among the images of the plurality of types of movable bodies 200 registered in the movable body registration unit 32. That is, the obstacle 100 within the monitoring area 100 may be a person as a movable body, and the person is facing the front (Yes in step S13, No in S21, and No in S31) (see FIGS. 20 and 21). In this case, steps S15 and S14 described earlier are executed.

On the other hand, the image of the obstacle 100 detected by the obstacle detection unit 23 may coincide with an image representing the laterally-facing person 200C among the images of the plurality of types of movable bodies 200 registered in the movable body registration unit 32. That is, the obstacle 100 within the monitoring area 100 may be a person as a movable body, but the person may not be facing the front (Yes in step S13, No in S21, and Yes in S31) (see FIGS. 22 and 23). In this case, a determination unit 25 outputs a determination result indicating that the obstacle 100 detected by the obstacle detection unit 23 is the laterally-facing person 200C. If the determination result indicates that the obstacle 100 is the laterally-facing person 200C, an area change unit 26 reads out the deceleration area AR202C for laterally-facing person and the stop area AR203C for laterally-facing person as the deceleration area AR202 for movable body and the stop area AR203 for movable body that are registered in the area registration unit 31 of a storage device 30 and changes a deceleration area AR102 and a stop area AR103 within the monitoring area AR100 that are set in an area setting unit 22 to the deceleration area AR202C for laterally-facing person and the stop area AR203C for laterally-facing person, respectively (step S32).

In this case, a speed control unit 24 limits a traveling speed of the apparatus main body 2 on the basis of the normal traveling area AR101, the deceleration area AR202C for laterally-facing person, and the stop area AR203C for laterally-facing person within the monitoring area AR100 that are set in the area setting unit 22 and a distance L measured by the distance-measuring sensor 42 (the distance L from the apparatus main body 2 to a movable body 200 within the monitoring area AR100) (step S14). That is, the speed control unit 24 controls the traveling speed of the apparatus main body 2 such that the apparatus main body 2 does not collide with the laterally-facing person 200C, as the apparatus main body 2 approaches the laterally-facing person 200C.

As can be seen from the above description, in the autonomous traveling apparatus 1 according to the third embodiment of the present invention, the person 200A is a front-facing person. If an image of the obstacle 100 detected by the obstacle detection unit 23 coincides with an image representing the laterally-facing person 200C among the images of the plurality of types of movable bodies 200 registered in the movable body registration unit 32, the determination unit 25 outputs a determination result indicating that the obstacle 100 detected by the obstacle detection unit 23 is the laterally-facing person 200C. If the determination result indicates that the obstacle 100 is the laterally-facing person 200C, the area change unit 26 changes the deceleration area AR102 and the stop area AR103 within the monitoring area AR100 that are set in the area setting unit 22 to the deceleration area AR202C for laterally-facing person and the stop area AR203C for laterally-facing person, respectively. If the obstacle 100 is the laterally-facing person 200C, the laterally-facing person 200C is less attentive than a front-facing person (the person 200A). Thus, if the obstacle 100 is the laterally-facing person 200C, the autonomous traveling apparatus 1 according to the third embodiment of the present invention changes the monitoring area AR100 from the monitoring area AR100 for object (with the normal traveling area AR101, the deceleration area AR102, and the stop area AR103) to a monitoring area for laterally-facing person (with the normal traveling area AR101, the deceleration area AR202C for laterally-facing person, and the stop area AR203C for laterally-facing person). This makes it possible to set a traveling speed for the laterally-facing person 200C under a stricter standard than that for a traveling speed for the person 200A (a front-facing person).

Fourth Embodiment

FIG. 24 is a block diagram showing the configuration of an autonomous traveling apparatus 1 according to a fourth embodiment of the present invention. Differences from the first embodiment will be described in the fourth embodiment.

As shown in FIG. 24, in the autonomous traveling apparatus 1 according to the fourth embodiment of the present invention, a monitoring device 40 includes a distance-measuring sensor 42 as described earlier. That is, the monitoring device 40 does not include the camera 41 according to the first embodiment.

FIG. 25 is a flowchart showing the operation of the autonomous traveling apparatus 1 according to the fourth embodiment of the present invention. FIG. 26 is a view showing outputs from the distance-measuring sensor 42 in a case where an obstacle 100 within a monitoring area 100 is a movable body 200 (a person 200A), in the autonomous traveling apparatus 1 according to the fourth embodiment of the present invention. FIG. 27 is a view showing the monitoring area 100 in the case where the obstacle 100 within the monitoring area 100 is the movable body 200 (the person 200A), in the autonomous traveling apparatus 1 according to the fourth embodiment of the present invention.

The distance-measuring sensor 42 first measures a distance L from an apparatus main body 2 to the obstacle 100 within the monitoring area AR100 in response to a clock signal from a clock signal output unit 27. In this case, an obstacle detection unit 23 receives an output from the distance-measuring sensor 42 (see FIG. 26) in response to a clock signal. As shown in FIG. 26, an output from the distance-measuring sensor 42 is a piece of data indicating the relationship between an output voltage and a distance, and the distance when the output voltage has a peak value represents the distance L.

As shown in FIG. 25, the obstacle detection unit 23 the obstacle detection unit 23 detects the distance L measured by the distance-measuring sensor 42 (the distance L from the apparatus main body 2 to the obstacle 100 within the monitoring area AR100) (step S12). In this case, step S11 according to the first embodiment is not executed.

Assume here that the distance L measured last time by the distance-measuring sensor 42 is a first distance L401 (see FIGS. 26 and 27). Assume that the distance L measured this time by the distance-measuring sensor 42 is a second distance L402 (see FIGS. 26 and 27). In this case, a determination unit 25 calculates a differential value L412 (see FIG. 27) between the second distance L402 and the first distance L401 (step S41).

The determination unit 25 determines whether the obstacle 100 within the monitoring area 100 is a movable body (step S13). More specifically, the determination unit 25 determines whether the differential value L412 is different from a set value which is predicted from a traveling speed of the apparatus main body 2.

For example, the obstacle 100 detected by the obstacle detection unit 23 may not have moved within the monitoring area 100, and the differential value L412 may be identical to the set value. That is, the obstacle 100 within the monitoring area 100 may not be a movable body (No in step S13). In this case, the determination unit 25 outputs a determination result indicating that the obstacle 100 detected by the obstacle detection unit 23 is not a movable body. After that, step S14 described earlier is executed.

On the other hand, the obstacle 100 detected by the obstacle detection unit 23 may have moved within the monitoring area 100, and the differential value L412 may be different from the set value (Yes in step S13). For example, the person 200A may be walking toward the apparatus main body 2, and the calculated differential distance L412 is shorter than a set differential distance L400. That is, the obstacle 100 within the monitoring area 100 may be the movable body 200 (the person 200A) (Yes in step S13) (see FIGS. 26 and 27). In this case, the determination unit 25 outputs a determination result indicating that the obstacle 100 detected by the obstacle detection unit 23 is the person 200A. After that, steps S15 and S14 described earlier are executed.

As can be seen from the above description, in the autonomous traveling apparatus 1 according to the fourth embodiment of the present invention, the monitoring device 40 includes the distance-measuring sensor 42 that measures the distance L from the apparatus main body 2 to the obstacle 100 within the monitoring area AR100. Assuming that the distance L measured last time by the distance-measuring sensor 42 is the first distance L401 and that the distance L measured this time by the distance-measuring sensor 42 is the second distance L402, the determination unit 25 calculates the differential value L412 between the second distance L402 and the first distance L401. If the differential value L412 is different from the set value predicted from the traveling speed of the apparatus main body 2, the determination unit 25 outputs a determination result indicating that the obstacle 100 detected by the obstacle detection unit 23 is the movable body 200. If the determination result indicates that the obstacle 100 is the movable body 200, an area change unit 26 changes a deceleration area AR102 and a stop area AR103 within the monitoring area AR100 that are set in an area setting unit 22 to a deceleration area AR202 for movable body and a stop area AR203 for movable body, respectively. As described above, in the autonomous traveling apparatus 1 according to the fourth embodiment of the present invention, the distance L from the apparatus main body 2 to the obstacle 100 within the monitoring area AR100 can be achieved by the distance-measuring sensor 42, and whether the obstacle 100 is the movable body 200 can be achieved by the distance-measuring sensor 42 and the determination unit 25.

Fifth Embodiment

FIG. 28 is a block diagram showing the configuration of an autonomous traveling apparatus 1 according to a fifth embodiment of the present invention. Differences from the first embodiment will be described in the fifth embodiment.

As shown in FIG. 28, in the autonomous traveling apparatus 1 according to the fifth embodiment of the present invention, a monitoring device 40 includes a camera 41.

That is, the monitoring device 40 does not include the distance-measuring sensor 42 according to the first embodiment.

FIG. 29 is a flowchart showing the operation of the autonomous traveling apparatus 1 according to the fifth embodiment of the present invention. FIG. 30 is a view showing outputs from the distance-measuring sensor 42 in a case where an obstacle 100 within a monitoring area 100 is a movable body 200 (a person 200A), in the autonomous traveling apparatus 1 according to the fifth embodiment of the present invention. FIG. 31 is a view showing the monitoring area 100 in the case where the obstacle 100 within the monitoring area 100 is the movable body 200 (the person 200A), in the autonomous traveling apparatus 1 according to the fifth embodiment of the present invention.

The camera 41 first photographs an image of the monitoring area AR100 in response to a clock signal from a clock signal output unit 27. In this case, an obstacle detection unit 23 receives an output (see FIG. 30) from the camera 41 in response to a clock signal. As shown in FIG. 30, an output from the camera 41 refers to an image of the monitoring area AR100. Alternatively, an output from the camera 41 may be obtained by merging an image of the monitoring area AR100 with an image of a line representing the monitoring area AR100.

As shown in FIG. 29, the obstacle detection unit 23 detects an image of the obstacle 100, which is different from a background image, from an image of the monitoring area AR100 which is photographed by the camera 41 (step S11). In this case, step S11 according to the first embodiment is not executed.

Assume here that a distance from an apparatus main body 2 to a boundary line ARB of the monitoring area AR100 is a first distance L501 (see FIGS. 30 and 31). Assume that a width of an image of the obstacle 100 within the monitoring area AR100 which is detected for the first time by the obstacle detection unit 23 is a first width W501 (see FIGS. 30 and 31). Assume that a width of an image of the obstacle 100 within the monitoring area AR100 which is detected this time by the obstacle detection unit 23 is a second width W502 (see FIGS. 30 and 31). Assume that a distance from the apparatus main body 2 to the obstacle 100 within the monitoring area AR100 that is detected this time by the obstacle detection unit 23 is a second distance L502 (see FIGS. 30 and 31). In this case, a determination unit 25 calculates the second distance L502 on the basis of the first distance L501, the first width W501, and the second width W502 (step S51). More specifically, the determination unit 25 calculates the second distance L502 by L502=L501×(W501/W502).

The determination unit 25 determines whether the obstacle 100 within the monitoring area 100 is a movable body (step S13). More specifically, the determination unit 25 determines whether the second distance L502 is different from a set distance which is predicted from a traveling speed of the apparatus main body 2.

For example, the obstacle 100 detected by the obstacle detection unit 23 may not have moved within the monitoring area 100, and the second distance L502 may be identical to the set distance. That is, the obstacle 100 within the monitoring area 100 may not be a movable body (No in step S13). In this case, the determination unit 25 outputs a determination result indicating that the obstacle 100 detected by the obstacle detection unit 23 is not a movable body. After that, step S14 described earlier is executed.

On the other hand, the obstacle 100 detected by the obstacle detection unit 23 may have moved within the monitoring area 100, and the second distance L502 may be different from the set distance (Yes in step S13). For example, the person 200A may be walking toward the apparatus main body 2, and the second distance L502 may be shorter than the set distance. That is, the obstacle 100 within the monitoring area 100 may be the movable body 200 (the person 200A) (Yes in step S13) (see FIGS. 30 and 31). In this case, the determination unit 25 outputs a determination result indicating that the obstacle 100 detected by the obstacle detection unit 23 is the person 200A. After that, steps S15 and S14 described earlier are executed.

As can be seen from the above description, the autonomous traveling apparatus 1 according to the fifth embodiment of the present invention further includes a movable body registration unit 32, in which respective images representing a plurality of types of movable bodies 200 are registered. The monitoring device 40 includes the camera 41 that photographs an image of the monitoring area AR100. The obstacle detection unit 23 detects an image of the obstacle 100, which is different from a background image, from an image of the monitoring area AR100 which is photographed by the camera 41. Assuming that the distance from the apparatus main body 2 to the boundary line ARB of the monitoring area AR100 is the first distance L501, that a width of an image of the obstacle 100 within the monitoring area AR100 which is detected for the first time by the obstacle detection unit 23 is the first width W501, that a width of an image of the obstacle 100 within the monitoring area AR100 which is detected this time by the obstacle detection unit 23 is the second width W502, and that the distance from the apparatus main body 2 to the obstacle 100 within the monitoring area AR100 that is detected this time by the obstacle detection unit 23 is the second distance L502, the determination unit 25 calculates the second distance L502 on the basis of the first distance L501, the first width W501, and the second width W502 (L502=L501×(W501/W502)). If the second distance L502 is different from the set distance that is predicted from the traveling speed of the apparatus main body 2, the determination unit 25 outputs a determination result indicating that the obstacle 100 detected by the obstacle detection unit 23 is the movable body 200. If the determination result indicates that the obstacle 100 is the movable body 200, an area change unit 26 changes a deceleration area AR102 and a stop area AR103 within the monitoring area AR100 which are set in an area setting unit 22 to a deceleration area AR202 for movable body and a stop area AR203 for movable body, respectively. As described above, in the autonomous traveling apparatus 1 according to the fourth embodiment of the present invention, whether the obstacle 100 is the movable body 200 can be achieved by the camera 41 and the obstacle detection unit 23, and a distance L from the apparatus main body 2 to the obstacle 100 within the monitoring area AR100 can be achieved by the camera 41 and the determination unit 25.

Sixth Embodiment

FIG. 32 is a block diagram showing the configuration of an autonomous traveling apparatus 1 according to a sixth embodiment of the present invention. Although the sixth embodiment can be applied to any of the first to fifth embodiments, differences from the third embodiment will be described here.

As shown in FIG. 32, in the autonomous traveling apparatus 1 according to the sixth embodiment of the present invention, a control device 20 further includes an identification information detection unit 28.

As shown in FIG. 32, in the autonomous traveling apparatus 1 according to the sixth embodiment of the present invention, a piece of registration identification information for identification of a movable body 200 is further registered in association with an image representing the movable body 200 in a movable body registration unit 32. For example, a piece 200AID of registration identification information for identification of a person 200A (adult 200A) is registered in association with an image representing the person 200A in the movable body registration unit 32.

FIG. 33 is a flowchart showing the operation of the autonomous traveling apparatus 1 according to the sixth embodiment of the present invention. FIG. 34 is a view showing a monitoring area 100 in a case where an obstacle 100 within the monitoring area 100 is the movable body 200 (the person 200A), in the autonomous traveling apparatus 1 according to the sixth embodiment of the present invention.

A camera 41 first photographs an image of the monitoring area AR100 in response to a clock signal from a clock signal output unit 27. A distance-measuring sensor 42 measures a distance L from an apparatus main body 2 to the obstacle 100 within the monitoring area AR100 in response to a clock signal.

The movable body 200 (the person 200A) that is the obstacle 100 is walking toward the apparatus main body 2 while carrying an apparatus which outputs an identification information ID (see FIG. 34). Examples of the apparatus that outputs the identification information ID include an IC key 60. The identification information ID is a piece of radio wave information from the IC key 60. For example, if a monitoring route is used in a house, an apartment house, or the like, the IC key 60 is carried by a resident or a guard.

As shown in FIG. 33, the obstacle detection unit 23 detects an image of the obstacle 100, which is different from a background image, from an image of the monitoring area AR100 which is photographed by the camera 41. The identification information detection unit 28 detects an identification information ID when the person 200A carrying the IC key 60 intrudes into the monitoring area AR100 (step S61). An obstacle detection unit 23 detects the distance L measured by the distance-measuring sensor 42 (the distance L from the apparatus main body 2 to the obstacle 100 within the monitoring area AR100) (step S12).

A determination unit 25 determines whether the obstacle 100 within the monitoring area 100 is a movable body (step S13). More specifically, the determination unit 25 determines whether an image of the obstacle 100 which is detected by the obstacle detection unit 23 coincides with an image representing the person 200A among images of a plurality of types of movable bodies 200 registered in the movable body registration unit 32. The determination unit 25 also determines whether the identification information ID detected by the identification information detection unit 28 coincides with the piece 200AID of identification information registered in the movable body registration unit 32.

For example, the identification information ID detected by the identification information detection unit 28 may coincide with the piece 200AID of identification information registered in the movable body registration unit 32. That is, the identification information ID output from the IC key 60 carried by the person 200A may coincide with the piece 200AID of identification information registered in the movable body registration unit 32 (Yes in step S13). In this case, the determination unit 25 outputs a determination result indicating that the obstacle 100 detected by the obstacle detection unit 23 is the person 200A. After that, step S21 and the subsequent steps described earlier are executed.

As can be seen from the above description, the autonomous traveling apparatus 1 according to the sixth embodiment of the present invention further includes the identification information detection unit 28 that detects an identification information ID when the person 200A carrying an apparatus (the IC key 60) which outputs the identification information ID intrudes into the monitoring area AR100. The piece 200AID of registration identification information is further registered in association with an image representing the person 200A in the movable body registration unit 32. If an identification information ID detected by the obstacle detection unit 23 coincides with the piece 200AID of identification information registered in the movable body registration unit 32, the determination unit 25 outputs a determination result indicating that the obstacle 100 detected by the obstacle detection unit 23 is the person 200A. As described above, in the autonomous traveling apparatus 1 according to the sixth embodiment of the present invention, whether the obstacle 100 is the movable body 200 can be achieved by the camera 41 and the obstacle detection unit 23 according to the first to third embodiments and the fifth embodiment or the identification information detection unit 28 and the determination unit 25. In the autonomous traveling apparatus 1 according to the sixth embodiment of the present invention, whether the obstacle 100 is the movable body 200 can be achieved by the distance-measuring sensor 42 and the determination unit 25 according to the fourth embodiment or the identification information detection unit 28 and the determination unit 25.

Seventh Embodiment

FIG. 35 is a view showing a monitoring area 100 for an autonomous traveling apparatus 1 according to a seventh embodiment of the present invention. Although the seventh embodiment can be applied to any of the first to sixth embodiments, differences from the first embodiment will be described here.

In the autonomous traveling apparatus 1 according to the seventh embodiment of the present invention, a deceleration area AR102 is divided into a plurality of deceleration areas AR102-1 and AR102-2 such that an apparatus main body 2 traveling at a set speed travels while decelerating gradually.

The deceleration area AR102-1 is provided between a normal traveling area AR101 and a stop area AR103. The deceleration area AR102-1 is a region for the apparatus main body 2 traveling at the set speed to travel at a first deceleration speed.

The deceleration area AR102-2 is provided between the deceleration area AR102-1 and the stop area AR103. The deceleration area AR102-2 is a region for the apparatus main body 2 traveling at the first deceleration speed to travel at a second deceleration speed. The second deceleration speed is lower than the first deceleration speed.

As can be seen from the above description, in the autonomous traveling apparatus 1 according to the seventh embodiment of the present invention, the deceleration area AR102 is divided into the plurality of deceleration areas AR102-1 and AR102-2. This makes a speed in the deceleration area AR102 variable.

As has been described above, the present invention is not limited to the above-described embodiments, and various changes can be made within the scope of the claims. That is, embodiments obtained by combining technical means appropriately modified within the scope of the claims are also included in the technical scope of the present invention.

REFERENCE SIGNS LIST 1 autonomous traveling apparatus
2 apparatus main body
3 wheel
3-1 front wheel
3-2 rear wheel
10 driving device
11 electric motor
12 transmission
12A shaft
13-1 front wheel shaft
13-2 rear wheel shaft
14-1 front wheel sprocket
14-2 rear wheel sprocket
15 belt
16 bearing
20 control device
21 traveling control unit
22 area setting unit
23 obstacle detection unit
24 speed control unit
25 determination unit
26 area change unit
27 clock signal output unit
28 identification information detection unit
30 storage device
31 area registration unit
32 movable body registration unit
40 monitoring device
41 camera
42 distance-measuring sensor
60 IC key
100 obstacle
200 movable body
200A person (adult) (front-facing person)
200AID piece of registration identification information
200B child
200C laterally-facing person
AR100 monitoring area
AR101 normal traveling area
AR102 deceleration area
AR102-1 deceleration area
AR102-2 deceleration area
AR103 stop area
AR202 deceleration area for movable body
AR202A deceleration area for person
AR202B deceleration area for child
AR202C deceleration area for laterally-facing person
AR203 stop area for movable body
AR203A stop area for person
AR203B stop area for child
AR203C stop area for laterally-facing person
ARB boundary line
ID piece of identification information
L distance
L101 distance
L102 distance
L103 distance
L201 distance
L202 distance
L203 distance
L401 first distance
L402 second distance
L412 differential value
L501 first distance
L502 second distance
W501 first width
W502 second width

The invention claimed is:

1. An autonomous traveling apparatus comprising:
a traveling control unit which causes an apparatus main body to travel autonomously at a set speed;
a monitoring device which monitors a monitoring area, the monitoring area being a region extending forward from the apparatus main body;
an area setting unit, in which a normal traveling area and a deceleration area are set for the monitoring area, the normal traveling area being a region for the apparatus main body to travel at the set speed, the deceleration area being provided between the normal traveling area and the apparatus main body and being a region for the apparatus main body traveling at the set speed to travel while decelerating;
an obstacle detection unit which detects an obstacle present in the monitoring area;
a speed control unit which, if the obstacle is detected by the obstacle detection unit, limits a traveling speed of the apparatus main body on the basis of the monitoring area set in the area setting unit and a distance from the apparatus main body to the obstacle within the monitoring area;
a determination unit which determines whether the obstacle detected by the obstacle detection unit is a movable body and outputs a determination result; and
an area change unit which, if the determination result indicates that the obstacle is the movable body, changes the deceleration area within the monitoring area set in the area setting unit to a deceleration area for movable body which is wider than the deceleration area and narrower than the normal traveling area.

2. The autonomous traveling apparatus according to claim 1, further comprising:
a movable body registration unit, in which respective images representing a plurality of types of movable bodies are registered, wherein
the monitoring device includes
a camera which photographs an image of the monitoring area and
a distance-measuring sensor which measures the distance from the apparatus main body to the obstacle within the monitoring area,
the obstacle detection unit detects an image of the obstacle, which is different from a background image, from the image of the monitoring area photographed by the camera,
the determination unit outputs the determination result indicating that the obstacle detected by the obstacle detection unit is the movable body if the image of the obstacle detected by the obstacle detection unit coincides with an image of one movable body among the images of the plurality of types of movable bodies registered in the movable body registration unit, and
the area change unit changes the deceleration area within the monitoring area set in the area setting unit to the deceleration area for movable body if the determination result indicates that the obstacle is the movable body.

3. The autonomous traveling apparatus according to claim 2, wherein the deceleration area for movable body is different for each of the types of the movable bodies.

4. The autonomous traveling apparatus according to claim 3, wherein
an image of each of at least one movable body among the images of the plurality of types of movable bodies registered in the movable body registration unit represents a person,
the determination unit outputs the determination result indicating that the obstacle detected by the obstacle detection unit is a person if the image of the obstacle detected by the obstacle detection unit coincides with an image representing the person among the images of the plurality of types of movable bodies registered in the movable body registration unit, and
the area change unit changes the deceleration area within the monitoring area set in the area setting unit to a deceleration area for person, the deceleration area for person being the deceleration area for movable body, if the determination result indicates that the obstacle is the person.

5. The autonomous traveling apparatus according to claim 2, wherein
an image of each of at least one movable body among the images of the plurality of types of movable bodies registered in the movable body registration unit represents a person,
the determination unit outputs the determination result indicating that the obstacle detected by the obstacle detection unit is a person if the image of the obstacle detected by the obstacle detection unit coincides with an image representing the person among the images of the plurality of types of movable bodies registered in the movable body registration unit, and
the area change unit changes the deceleration area within the monitoring area set in the area setting unit to a deceleration area for person, the deceleration area for person being the deceleration area for movable body, if the determination result indicates that the obstacle is the person.

6. The autonomous traveling apparatus according to claim 5, wherein
the determination unit outputs the determination result indicating that the obstacle detected by the obstacle detection unit is a child if the image of the obstacle detected by the obstacle detection unit coincides with an image representing the child among the images of the plurality of types of movable bodies registered in the movable body registration unit, and
the area change unit changes the deceleration area within the monitoring area set in the area setting unit to a deceleration area for child, the deceleration area for child being wider than the deceleration area for person and narrower than the normal traveling area, if the determination result indicates the obstacle is the child.

7. The autonomous traveling apparatus according to claim 5, wherein
the person is a front-facing person,
the determination unit outputs the determination result indicating that the obstacle detected by the obstacle detection unit is a laterally-facing person if the image of the obstacle detected by the obstacle detection unit coincides with an image representing the laterally-facing person among the images of the plurality of types of movable bodies registered in the movable body registration unit, and
the area change unit changes the deceleration area within the monitoring area set in the area setting unit to a deceleration area for laterally-facing person, the deceleration area for laterally-facing person being wider than the deceleration area for person and narrower than the normal traveling area, if the determination result indicates that the obstacle is the laterally-facing person.

8. The autonomous traveling apparatus according to claim 2, further comprising:
an identification information detection unit which detects a piece of identification information when the person carrying an apparatus which outputs the piece of identification information intrudes into the monitoring area, wherein
a piece of identification information is further registered in association with an image representing the person in the movable body registration unit, and
the determination unit outputs the determination result indicating that the obstacle detected by the obstacle detection unit is the person if the piece of identification information detected by the obstacle detection unit coincides with the piece of identification information registered in the movable body registration unit.

9. The autonomous traveling apparatus according to claim 1, wherein
the monitoring device includes a distance-measuring sensor which measures a distance from the apparatus main body to the obstacle within the monitoring area,
the determination unit
calculates a differential value between a first distance and a second distance, the first distance being the distance measured last time by the distance-measuring sensor, the second distance being the distance measured this time by the distance-measuring sensor, and
outputs the determination result indicating that the obstacle detected by the obstacle detection unit is the movable body if the differential value is different from a set value which is predicted from the traveling speed of the apparatus main body, and
the area change unit changes the deceleration area within the monitoring area set in the area setting unit to the deceleration area for movable body if the determination result indicates that the obstacle is the movable body.

10. The autonomous traveling apparatus according to claim 1, further comprising:
a movable body registration unit, in which respective images representing a plurality of types of movable bodies are registered, wherein
the monitoring device includes a camera which photographs an image of the monitoring area,
the obstacle detection unit detects an image of the obstacle, which is different from a background image, from the image of the monitoring area photographed by the camera,
the determination unit
calculates a second distance on the basis of a first distance, a first width, and a second width, the first distance being a distance from the apparatus main body to a boundary line of the monitoring area, the first width being a width of the image of the obstacle within the monitoring area that is detected for a first time by the obstacle detection unit, the second width being a width of the image of the obstacle within the monitoring area that is detected this time by the obstacle detection unit, the second distance being a distance from the apparatus main body to the obstacle within the monitoring area that is detected this time by the obstacle detection unit, and outputs the determination result indicating that the obstacle detected by the obstacle detection unit is the movable body if the second distance is different from a set distance which is predicted from the traveling speed of the apparatus main body, and the area change unit changes the deceleration area within the monitoring area set in the area setting unit to the deceleration area for movable body if the determination result indicates that the obstacle is the movable body.

11. The autonomous traveling apparatus according to claim 1, wherein the deceleration area is divided into a plurality of deceleration areas such that the apparatus main body traveling at the set speed travels while decelerating gradually.

12. An autonomous traveling method of an autonomous traveling apparatus comprising the steps of:

monitoring a monitoring area being a region extending forward from the autonomous traveling apparatus;

setting, for the monitoring area, a normal traveling area and a deceleration area, the normal traveling area being a region for the autonomous traveling apparatus to travel at a set speed, the deceleration area being provided between the normal traveling area and the autonomous traveling apparatus and being a region for the autonomous traveling apparatus traveling at the set speed to travel while decelerating;

detecting an obstacle present in the monitoring area;

if the obstacle is detected, limiting a traveling speed of the autonomous traveling apparatus on the basis of the monitoring area set in the step of the setting and a distance from the autonomous traveling apparatus to the obstacle within the monitoring area;

determining whether the obstacle detected in the step of the detecting is a movable body; and if the obstacle is determined as the movable body, changing the deceleration area within the monitoring area set in the step of the setting to a deceleration area for movable body which is wider than the deceleration area and narrower than the normal traveling area.

13. A non-transitory recording medium recording a program for executing the autonomous traveling method according to claim 12.

* * * * *